(12) United States Patent
Sieracki

(10) Patent No.: US 12,105,506 B1
(45) Date of Patent: Oct. 1, 2024

(54) SYSTEM AND METHOD FOR IDENTIFYING AND ASSEMBLING SENSOR COMBINATIONS OPTIMIZED FOR OUTPUT REQUIREMENTS

(71) Applicant: REALITY ANALYTICS, INC., Columbia, MD (US)

(72) Inventor: Jeffrey Sieracki, Silver Spring, MD (US)

(73) Assignee: Renesas Electronics America, San Jose, CA (US)

( * ) Notice: Subject to any disclaimer, the term of this patent is extended or adjusted under 35 U.S.C. 154(b) by 433 days.

(21) Appl. No.: 17/648,919

(22) Filed: Jan. 25, 2022

Related U.S. Application Data

(60) Provisional application No. 63/141,466, filed on Jan. 25, 2021.

(51) Int. Cl.
*G06N 20/00* (2019.01)
*G05B 23/02* (2006.01)

(52) U.S. Cl.
CPC ..... *G05B 23/0245* (2013.01); *G05B 23/0254* (2013.01); *G06N 20/00* (2019.01)

(58) Field of Classification Search
CPC . G05B 23/0245; G05B 23/0254; G06N 20/00
See application file for complete search history.

(56) References Cited

U.S. PATENT DOCUMENTS

| | | | |
|---|---|---|---|
| 6,268,853 B1 | 7/2001 | Hoskins et al. | |
| 7,259,778 B2 | 8/2007 | Arpa et al. | |
| 7,487,070 B2 | 2/2009 | Shay et al. | |
| 8,065,204 B2 | 11/2011 | Gerzymisch et al. | |
| 9,087,164 B2 | 7/2015 | Perry et al. | |
| 9,317,626 B2 | 4/2016 | Chan | |
| 9,406,022 B2 | 8/2016 | Damm | |
| 10,102,320 B2 | 10/2018 | Pataky | |
| 10,192,023 B2 | 1/2019 | Byers et al. | |
| 10,664,754 B2 | 5/2020 | Gotou | |
| 2007/0288208 A1 | 12/2007 | Grigsby et al. | |
| 2013/0332138 A1 | 12/2013 | Koga | |
| 2016/0343099 A1 | 11/2016 | Sellmann et al. | |
| 2017/0076015 A1 | 3/2017 | Patel et al. | |
| 2017/0300598 A1 | 10/2017 | Akavia et al. | |
| 2020/0209935 A1 | 7/2020 | Har-Shai et al. | |
| 2020/0284883 A1 | 9/2020 | Ferreira et al. | |
| 2021/0172918 A1* | 6/2021 | Abdi | G01N 33/0031 |

FOREIGN PATENT DOCUMENTS

| | | |
|---|---|---|
| CA | 2225721 A1 | 6/1998 |
| WO | 2020023998 A1 | 2/2020 |
| WO | 2020167316 A1 | 8/2020 |
| WO | 2020247868 A1 | 12/2020 |

* cited by examiner

*Primary Examiner* — Gary Collins
(74) *Attorney, Agent, or Firm* — Rosenberg, Klein & Lee

(57) ABSTRACT

A system and method are provided for identification of a combination of sensors suitable for achieving a set of output requirements, enabling assembly thereof. An arrangement of sensors is assembled according to an optimized sensor set, generated to define at least one sensor channel having a threshold value for at least one quality criterion. The sensor sets are generated by down-selection of the sensor channels from a previously tested set of available channels to a subset mapping to a set of required output states. Assignment of a threshold value for each sensor channel is based on a mapping of the value to a target value of a performance metric.

19 Claims, 16 Drawing Sheets

Start Sensor Selection

Select which data channels to include and subsets to test for best combination.

Data Channels

- ☑ Channel 3  400 Hz
- ☑ Channel 4  400 Hz
- ☑ Channel 5  400 Hz
- ☑ Channel 6  400 Hz

Test Subsets

- ☑ Single Channels
- ☑ Pairs
- ☑ Sets of 3
- ☐ All channels 17 total test combinations

[Start] [Cancel]

SYSTEM AND METHOD FOR IDENTIFYING AND ASSEMBLING SENSOR COMBINATIONS OPTIMIZED FOR OUTPUT REQUIREMENTS

RELATED PATENTS AND APPLICATIONS

This application is based on U.S. Provisional Patent Application No. 63,141,466, filed on 25 Jan. 2021, the contents of which are incorporated herein by reference.

BACKGROUND OF THE INVENTION

The subject system and method are generally directed to efficient consideration and optimization of arrangements of sensors. The system and method generally provide for assistance in optimizing both the number of sensors required to output particular information, and a threshold level of quality of those sensors according to one or more criteria in order to achieve a target performance for this output.

It has become increasingly easy for engineers to equip devices to sense information about them and their environment. For example, and without limitation, this includes sensors to measure data such as shock, acceleration, speed, pressure, sound, current, amperage, temperature, humidity, rotation, position, and so forth. Many of these types of sensors are available at a variety of sensitivity levels, some at lab quality, and others less accurate but more cost-effective.

Once installed, these sensors can then be employed in combination with one or more computer processors for a variety of automated processes. As but one example application, a sensor array can be installed on and/or into a device for the purpose of machine health monitoring. Such an array can capture data for use in classifying machine events or states, process success or errors, anomalies, and so forth. Other applications are also possible.

For any process involving the use of data captured by sensors, an engineer must consider which combinations of sensors can detect the input signals necessary to produce the desired outputs. These combinations reflect not only the type of each sensor, but its performance according to several relevant criteria. For this reason, an engineer can be presented with an abundance of options in designing a sensor array for a given set of output requirements, and may be required to select the most cost-effective of these options that can still meet the minimum requirements for the needs of the design. This selection alone may prove an overwhelming project.

SUMMARY OF THE INVENTION

It is an object of the disclosed system and method to automatically narrow a list of sensor combinations to those which are most efficient and cost-effective at achieving a given set of output requirements.

It is another object of the disclosed system and method to identify preferred sensor types and locations on a device to thereby receive sufficient information to achieve the output requirements.

It is yet another object of the disclosed system and method to identify threshold levels of quality for those sensors necessary to achieve target performance levels, thereby selecting for more cost-effective sensors.

These and other objects may be attained in a system and method for identifying and assembling sensor combinations optimized for output requirements. In accordance with certain embodiments of the present invention, a method is provided for efficiently identifying and assembling a combination of sensors suitable for achieving a set of output requirements which include a set of required output states. The method includes, on a processor, executing a sensor optimizer to generate at least one optimized sensor set defining at least one sensor channel. Each sensor channel has a threshold value for at least one quality criterion. Each optimized sensor set is validated for the set of output requirements by executing a channel selector to select sensor channels of the optimized sensor set according to the set of output requirements. The sensor channels of the optimized sensor set are down-selected from a predetermined set of available sensor channels, and map to the set of required output states. Each optimized sensor set is further validated for the set of output requirements by, for each selected sensor channel, executing a sensitivity balancer to determine the respective threshold value therefor according to the set of output requirements. The threshold value is determined based on a prior testing of the sensor channel with respect to an input signal therefor. The method further includes assembling an arrangement of sensors according to a selected one of the optimized sensor sets.

In accordance with other embodiments of the present invention, a method is provided for efficiently identifying and assembling a combination of sensors suitable for achieving a set of output requirements. The method includes testing each sensor channel of a predetermined set of sensor channels by transducing at least one input signal. The input signal is processed at a plurality of quality levels for at least one quality criterion. The method further includes, on a processor, executing a sensor optimizer to generate at least one optimized sensor set validated for the set of output requirements. The optimized sensor set defines at least one sensor channel. The method further includes assembling an arrangement of sensors according to a selected one of the optimized sensor sets.

In accordance with yet other embodiments of the present invention, a system is provided for efficiently identifying and assembling a sensor arrangement suitable for achieving a set of output requirements which include a set of required output states. The system includes a processor and a memory coupled thereto. The processor executes a sensor optimizer to generate optimized sensor sets defining at least one sensor channel which has a threshold value for at least one quality criterion. The sensor optimizer includes a channel selector configured to select sensor channels of the optimized sensor set according to the set of output requirements. The sensor channels of the optimized sensor set are down-selected from a predetermined set of available sensor channels, and map to the set of required output states. The sensor optimizer further includes a sensitivity balancer configured to determine a threshold value for at least one quality criterion for a sensor channel according to the set of output requirements. The determination is based on a prior testing of the sensor channel with respect to an input signal therefor. The system enables an arrangement of sensors to be assembled according to an optimized sensor set generated by the sensor optimizer.

Additional aspects, details, and advantages of the disclosed system and method will be set forth, in part, in the description and figures which follow.

BRIEF DESCRIPTION OF THE DRAWINGS

FIGS. 5A-K are depictions of illustrative examples of graphic user interfaces, in accordance with exemplary embodiments of the present invention.

DETAILED DESCRIPTION OF THE PREFERRED EMBODIMENTS

Figure 1:
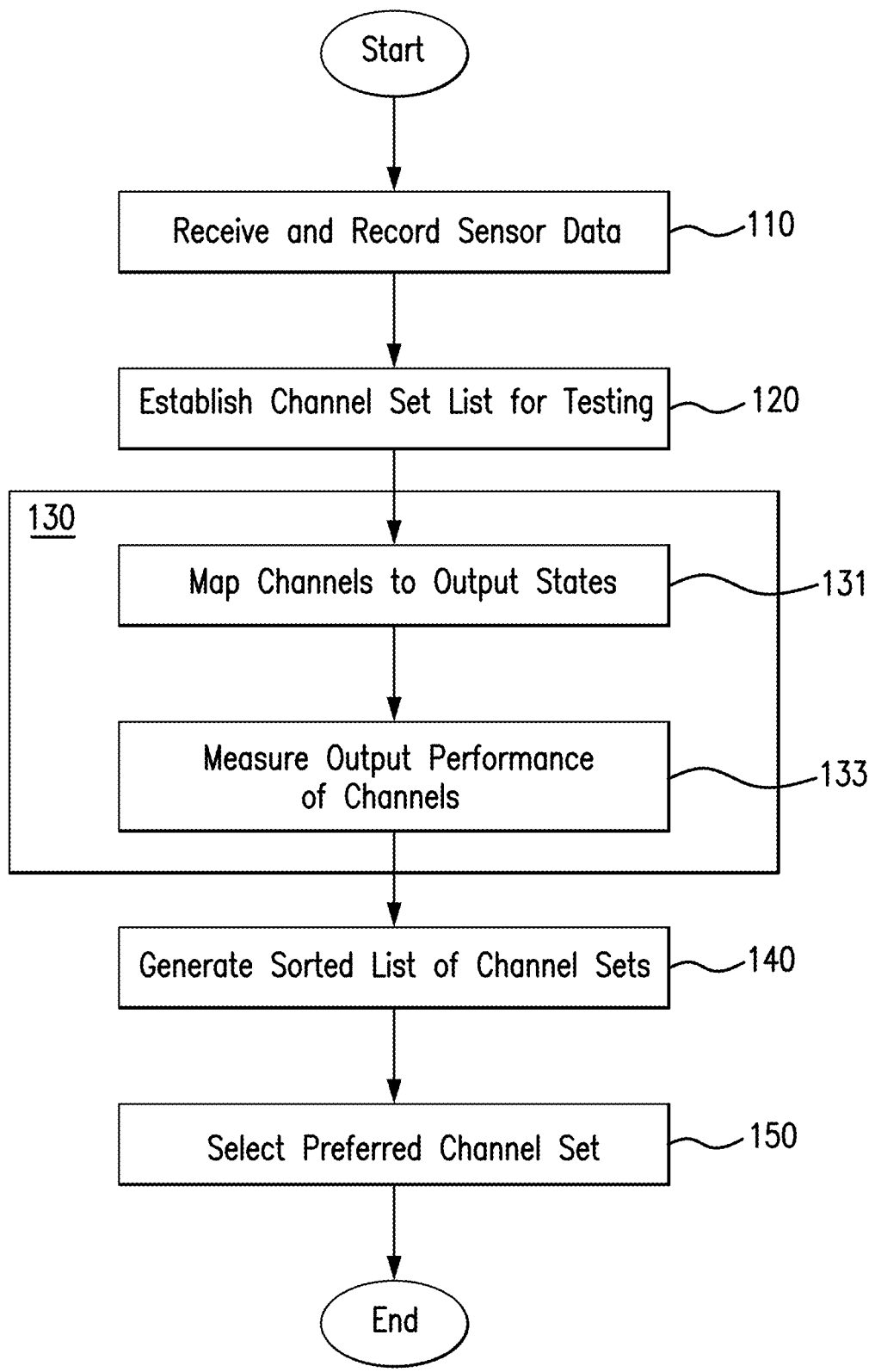
FIG. 1 is a flow diagram identifying one or more sensor combinations suitable for achieving a set of output requirements, in accordance with an exemplary embodiment of the present invention.

Reference will now be made in detail to exemplary embodiments, which are illustrated in the accompanying drawings, wherein like reference numerals refer to the like elements throughout. The embodiments are described below in order to explain the disclosed system and method with reference to the figures illustratively shown in the drawings for certain exemplary embodiments for sample applications.

The present invention focuses on the problem of optimization of the selection of sensor channels and sensor performance in light of output state requirements. It further relates to the application of machine learning in providing guidance in such selection. It addresses applications of machine learning as a gauge of theoretical performance. It further addresses applications when machine learning, or the specific models generated in the evaluation, may not be part of the final deployed project. It is also directed toward the optimization of bill of materials (BOM) costs and engineering complexity in selecting the data streams used, the specific sensors used, and the decision model used in a final product.

As previously noted, devices are more frequently equipped with one or more sensors to determine the state of the device, for reasons of machine health or otherwise. The sensors receive data streams or input signals which are interpreted on a processor, sometimes in combination, to make determinations. An engineer or designer of the device, and particularly of the sensor arrangement to be installed on the device, must make several decisions in the type, location, quality, and number of sensors, such that the resulting arrangement will provide the data streams or input signals necessary for the required determinations. A decision framework to assist in the decision process, by narrowing down the number of choices to make, is desirable.

Machine learning, also known as artificial intelligence, is increasingly being applied in many contexts to detect and classify conditions, and make decisions, based upon streams of data. However, older decision frameworks—such as decision trees, if-then statements, thresholds, classic and fuzzy logic, and so forth—are often still employed. Such older methods persist both because they are familiar and therefore easily explained and understood by practitioners, and because in many cases they still provide a more compact solution than the machine learning methods.

For both new and old decision frameworks, it is important for an engineer to decide (A) which potential data streams are most important, (B) which are sufficient to make a reliable decision, (C) what kind and quality of sensor is necessary to make the target decisions, and (D) what is the overall best and most cost effective way to build and deploy a system to make use of this data.

As a specific example, consider an air conditioning (AC) unit, in which a sensor arrangement will be installed to monitor its health of operation. The product engineer wishes to minimize the impact on bill of materials (BOM) costs, so that the product remains as inexpensive as possible to manufacture. However, certain minimal performance requirements must be met, such as accuracy of detection.

The AC unit may have multiple modes of failure, including, for example, air flow blockage, fan failure, compressor failure, coil icing, capacitor failure, refrigerant charge level, and so forth. Detection of each of these failures may be termed an "output state" of a machine health system, and the output requirements of such a system will therefore include the ability to identify when these failures have (and/or have not) occurred with a particular level of accuracy. Output states can also be scalar rather than binary, such as an expected remaining lifespan of a component, or how close it is to exceeding some capacity under its present operations. In certain applications, it will be desirable to include the direct measurement from one or more of the sensors among the output states. However, for consumer products in particular, this data will frequently be meaningless to the end consumer, and other types of output states will provide more useful information.

Applicable sensors for an AC unit context can include:
Thermocouples and/or humidity sensors placed on motors, coils, refrigerant lines, electrical boards, in air paths, etc.
Accelerometers and/or microphones placed similarly, or on the unit chassis itself.
Electrical sensors (both current and voltage) placed on power lines, fan and compressor leads, etc.

The engineer is therefore faced with an enormous list of possible choices and combinations thereof, and must reduce these to the subset of combinations representing effective yet reasonably priced systems.

The relationship is further complicated as individual sensors have different costs, and combinations of sensors have different net accuracy for different problems. For example, an inexpensive thermocouple pair might be highly accurate in detecting the conditions of coil icing or air flow blockage, but would tell us nothing about compressor lubrication issues. An accelerometer costs a bit more but may provide more information about the compressor motor and vibration. A capacitor failure may be directly detected electrically, or indirectly detected by changes in the motor operation. Whether or not a particular sensor in a particular placement can detect a particular problem may be clear in some circumstances, but may need to be determined experimentally in others.

Briefly, a system and method realized in accordance with certain aspects of the present invention provide for simplification and partial or total automation of the analysis and decision process described above.

Applications are by no means limited to the use case of an air conditioning unit. One of ordinary skill in the art will appreciate that the system and method disclosed herein can be used to design sensor arrangements for numerous devices, including but not limited to automobiles, industrial systems, and a variety of consumer products. Additionally, sensor arrangements can be used for other functions than machine health observation, including any form of anomaly detection and/or detection of various internal or external states. Examples include, but are not limited to: personal or animal health monitoring, security and intrusion alerts, presence or alertness monitoring, bio-metrics, tracking activity in an area, characterizing a sound environment, determining information about a geophysical or an RF environment, and detecting specific movements or gestures. Any application in which there are many possible choices of types, quality, and placement of sensors for solving a problem can benefit from the rapid evaluation of choices for optimal selection and/or placement provided by embodiments of the invention.

As one exemplary case, consider an automobile. It might be extremely desirable to equip an automobile with a combination of sensors that can monitor for road conditions, weather conditions, motor and suspension health, and the presence of emergency vehicles. Still another exemplary case is a control mechanism using gesture or sound recognition, integrated with other functions in the same sensors. In both cases, as in the AC unit example, an ideal design for the arrangement of sensors would minimize or optimize the number of sensors required to identify all such conditions and states. Such a design could be an enormous savings to the BOM over having individual sensors for each potential issue. In other words, the goal is to minimize the number of sensors in the sensor arrangement to achieve the broadest coverage over applications, while maintaining target accuracy requirements.

In addition to selecting a set of sensors which has been optimized in number, the design can be further optimized by choosing the least complex or least expensive sensors which are sufficient for the needs of the application. In many cases, optimization of BOM or system development costs is directly impacted by both aspects. For example, a system which employs lower sample rates (e.g. 1 Hz temperature vs 400 Hz vibration vs 48 kHz sound) is less complex and less expensive due to the low bandwidth requirements in both acquisition of the data and in processing the data. This principle is generally applicable regardless of the sensor channel type or input signal type under consideration. Lower bandwidth sensors are nearly always less expensive and less complex to support than higher bandwidth sensors, and bandwidth and sample rate go hand in hand.

Along with bandwidth and sample rate, the quality of the sensor can be measured by other quality criteria, with a sensor of lower quality again expected to be the less expensive option, all other factors being equal. These other sensor quality criteria include:

Bit depth: The dynamic range of a digital sensor. Lower bit depths are simpler, and cheaper to support, at the cost of a lower resolution for the transduced signal.

Noise immunity/Signal-to-noise ratio: The level of internal noise (or "self-noise"), as well as the ability of the sensor to filter environmental background noise from received signals. Sensors with lower signal-to-noise ratio will be less precise due to the interference of noise, but also less costly and complex.

Number of signal channels: Certain types of sensors may have multiple internal channels. One particular example is an accelerometer, which may have three channels (one for each of the x-y-z axes), or more than three (measuring on additional, non-perpendicular axes to better determine rotation), or just one (for when movement on only one axis is relevant). Another example is a color video sensor, which is frequently implemented with three or more channels to capture different light wavelengths, as opposed to a black and white sensor which captures light intensity on a single channel. Clearly if a single-channel sensor can solve the problem, it will be less complex and generally less expensive than a multi-channel solution. (It is noted that this is a distinct consideration from the collective number of channels across all sensors in the system, each of which will have at least one channel. For ease of description, the signal channels of one sensor will be described throughout this disclosure as bundled into one "sensor channel," regardless of whether they are outputted from the sensor by a collective means or individual means.)

Accuracy/Tolerance: Generally, accuracy is the correctness of the transduced signal as compared to the true signal, whether that signal be audio (for a microphone), g-level (for an accelerometer), temperature (for a thermocouple), or another type. Tolerance is a measure of how repeatable that accuracy is across devices. A less accurate sensor, or one of looser tolerance, will risk errors in its measurements of greater magnitude than a more accurate sensor or one of tighter tolerance. More precise, accurate sensors provide more reproducible and accurate decisions with smaller error, but also cost more. This criterion is inherently affected by the other criteria (for example, the bit depth of a sensor defines a resolution limit A of any transduced signals, and will therefore be accurate, at most, to within +0.54) but also by other factors.

Again, the goal of optimization to minimize the sensor specifications to control costs and complexity, while maintaining target accuracy requirements.

Aspects of the invention address optimization of both sensor channel selection and sensor sensitivity evaluation.

"Sensor channel selection" is used herein to describe the process of down-selecting, from among a larger set of possible or available sensor channels, a subset which efficiently enables the problem to be solved. For ease of description, throughout this disclosure the term "sensor channel" will describe both the type of sensor (for example, a thermocouple) and its disposition on the device being monitored (for example, on the surface of a particular component), as this most precisely reflects the input signals that this sensor channel is expected to receive, transduce, and measure (for example, the heat emitted from said component). Therefore, the selection of a "sensor channel" will cover selection of both properties. As can be easily seen, the number of sensor channels, and combinations thereof, that might be relevant are numerous.

Certain aspects of the present invention center around the observation that, while a solution using a specific sensor arrangement may need to be uniquely engineered, machine learning provides a mechanism by which any generic set of input channels may be mapped to any particular set of solutions without regard to the details of the engineering.

The machine learning solution need not be the best solution, nor does it need to be easily explainable at the selection stage. The machine learning approach merely provides proof that it is possible to solve the problem—to produce the required output states—with the set of selected sensor channels. This is a great aid to design engineering in and of itself.

For example, in the example case of the AC unit, above, it may be desirable to determine that air flow is blocked. Using thermocouples, an engineer might observe that the temperature delta will be different with open blower airflow between two points than with that airflow blocked. Using accelerometers, however, the preferred method changes: for example, air flow blockage is detectable by a change in the vibration of the fan as it becomes free spinning rather than moving air. Using a microphone, the sound of the fan, or the sound of the air flow itself, can indicate a blockage. And using electrical measure, a change in the current load on the fan can indicate that it is moving less air. In summary, each sensor type has its own unique solution.

Certain embodiments of the present invention have the advantage that the machine learning methods do not rely on knowing each and every potential engineering solution. A machine learning model will map sensor channels and their input signals to resulting output states. No physical understanding is required, unburdening the engineer from having to model by hand each possible decision schema, and allowing the mapping to occur automatically.

It is noted that the term "machine learning" is used generally throughout this disclosure and is not limited to a particular method. Types of "machine learning" include but are not limited to so-called "deep learning," neural networks, support vector machines, decision trees, random forests, logical regression, and similar without limitation, any of which are used in various implementations of the invention as suitable to the needs of the particular application. Other equivalent methods will be known in the art to data scientists, statisticians, and machine learning practitioners, and are also within the scope of the invention. In certain embodiments, the machine learning further includes exploration of feature spaces, to enable the machine learning engine to better develop the mappings. In various embodiments, the output can be detection, classes, or regression to a numeric value, howsoever the task at hand is naturally defined. Any method that is capable of training on examples to establish a mapping from the input signals to the output state the engineer wishes to detect is suitable for the needs of the invention. To this end, generalized methods are preferred over those that require and explicit model adjustment—thus either feature explorations coupled with SVM, random forests or neural nets, or deep learning methods that discover features are, for example, strongly preferred over manual definition of features or manual statistical factor models.

A general flow of processes for identifying one or more sensor combinations suitable for achieving a set of output requirements, in accordance with an exemplary embodiment of the present invention, will now be described with reference to FIG. 1.

At block 110, data is recorded in a controlled setting using a full set of options for available sensor channels. An engineer preferentially instruments the target device with a large set of sensors to provide available sensor channels varying both in type and location. If practical, input from all of these sensor channels are collected at once; thus providing a direct matched comparison of performance across all of them under identical conditions. Because this large number of sensors will be required only for the test device and not for a mass-produced design, cost is of relatively minor consequence. However, in some instances, a full set may not be practical for reasons of space, mutual interference, or other complicating factors. In such instances, test conditions can be repeated in time sequence with alternatives sensor arrangements installed sequentially, until all possible sensor channels are tested.

Preferentially, the engineer will establish each condition of interest in a controlled fashion, recording the data to be predicted or detected as the end goal, and likewise recording metadata that may (or may not) affect the behavior of the sensors.

For example, to test for the detection of airflow blockage, data is recorded at block 110 under both normal air flow conditions and under an induced airflow blockage. If it is believed that weather is a factor in this detection, the same two states of operation are recorded under various temperature and humidity conditions. Confounds between conditions can also be evaluated: for example, recording air flow blockage and low refrigerant conditions together and separately.

At block 120, a list of practical and/or desirable sensor channel sets, or combinations of sensor channels, are established for evaluation. Preferentially, the engineer establishes this list. According to the convenience of the particular application and circumstances, this can be an individual and exhaustive list of subsets of the complete set of available sensor channels established at 110, or by description: e.g. "test all possible combinations," "test all pairs of sensors," "test all single channels, pairs, and triplets," and so forth. In some embodiments, the tests will be guided by practicality: e.g., "test all groups of thermocouples," "test all groups of accelerometers," "test all groups of accelerometers that are from the same physical sensor," etc. Preferentially, the setup options are combined, so that the engineer can establish a reasonable set of sensor channels to explore, guided by practical limits, but will not need to list each combination explicitly.

At block 130, for each sensor channel set in the list established at 120, the output performance that is possible using those channels is maximized. Preferably, at block 131, one or more machine learning models are trained to map the sensor channels, and by extension the input signals which will be received through the channels, to output states. Using this mapping, at block 133, the performance of the mapped sensor channels at correctly producing the correct output states is measured. Thus, a baseline measure of performance is established that may be achieved using each combination of sensor channels.

The machine learning training preferably groups data by the possible testing groups, supplying the data resulting from use of each group in turn. As a simple example, if there are three available sensor channels (for convenience, labeled A, B, and C), and the system is set to test all pairs, then the data points from A and B will be provided in a first training subset, the data points from B and C will be provided in a second training subset, and the data points from A and C will be provided in a third training subset. Depending on the specific machine learning method, the preferred modeling method can include training a single model by providing the training mechanism all three of these training subsets in series, or alternatively training three separate models each on a corresponding one of the subsets.

It is again noted that the models may not produce the best possible accuracy achievable for their respective combinations, as they have not been extensively optimized, nor has the engineer spent time hand-crafting a solution. The intent is to demonstrate that performance of at least the outputted level is achievable. This allows an engineer to rapidly and significantly reduce the available options to a manageable number. The engineer can then focus on further optimizing only the sensor combinations determined to have the best performance. The engineer can also simply select the cheapest set of sensors that solve the problem within required performance targets.

With a basic understanding of combinatorics, it will be recognized that a large number of combinations could need to be evaluated and compared during this process. For example, if twelve data channels are recorded, there are two hundred and twenty ways to combine three of them. This is a moderate number for a computer, but an unwieldy number for an engineer to review by hand. That is to say, even for a small number of combinations, it would be extremely time consuming for the engineer to make this evaluation by hand. By decoupling an understanding of each physical model from determining what is possible, the machine evaluation process will save significant time.

Preferentially, the engineer will still limit the scope to those channel combinations determined reasonable, as even for a machine, the combinatorics may be unwieldy. For example, there are over 479 million ways to choose any combination of twelve sensors. That said, given modern availability of large computing clouds, a significant number of combinations may be tested quickly by using a sufficient number of servers in parallel. Machine time is typically much less expensive than human time.

At block 140, a list is generated for the tested sensor channel sets, and is sorted by performance. In various embodiments, performance is evaluated by a variety of suitable measures. As a simple example measure, the performance on training data can be used as the baseline, and will be sufficient for quick and basic evaluation of choices in some embodiments. However, as is known in the art, the performance of a machine learning method on its own training data does not always generalize well to other data. Therefore, preferably, a hold-out data test is established, in which at least some of the data is held out from training. Performance of each combination can then be evaluated on this held-out data.

In implementations where the machine learning can be performed with sufficient speed, it is even more preferable to use k-fold validation. In k-fold tests, the data is divided into folds, and each fold held out while the remainder are used for training. In this way, each data point is tested as part of a hold-out set at least once, and the model is trained multiple times to assess overall performance on unseen data.

Still other suitable measures for evaluating performance are known or can be imagined by those of ordinary skill in the art, and are within the scope of the invention.

In certain embodiments, performance is also quantified on metrics other than, or in addition to, overall accuracy. For example, in certain applications, suppressing false alarms is more important than detection of true positives, or detection of particular conditions or classes is highly important compared to others. F-score is also a possible performance metric, and still other suitable metrics are known in the art of statistics. Thus, preferably, the list of results is sortable by a variety of performance metrics under the control of the end user, who may have requirements related to any of these aspects.

This exploratory evaluation by various criteria enables the user, at block 150, to make an informed choice of one of the generated sensor channel sets.

In some embodiments, the user simply sorts the list, and relies on various columns of data to evaluate the outcome. In others, the user can establish a specific cost function that weights the outcomes according to various performance metrics to achieve an overall score.

In still other embodiments, the user can add cost requirements for one, some, or all of the sensors that are factored into such a score. For example, for the example of testing an AC unit for air flow blockage, either thermocouples or accelerometers are generally suitable for generating the required output state of "blocked/not blocked," and both options will be initially presented. However, for this example, assume that a thermocouple of any given accuracy costs roughly one-fifth the price of an accelerometer, and also that a three-axis accelerometer of any given accuracy costs roughly 150% that of a single axis accelerometer. Ideally, these options will be appropriately weighted based on this general cost information, in addition to the weights applied for cost of meeting target performance criteria. Therefore, in certain embodiments, the system provides the user with a cost score for each combination of sensor channels which reflects all of these factors, making it easier to evaluate the tradeoffs by reducing them to a single number.

As discussed above, the sensitivity of sensors according to various quality criteria, such as sample rate, bit depth, noise, and accuracy tolerance, is a second important factor in choosing the best sensor for the job. The quality criteria must be optimized to balance two considerations. The sensors must meet the performance criteria required for the output measurements, and the resulting output states, to be sufficiently accurate. However, the sensors should exceed these criteria by as little as possible, thus being the least expensive sensors necessary to meet the output requirements.

It is noted that high quality sensors are preferably used in development work and/or lab settings while the possible sensor sets are being considered and tested as described above. This is acceptable as only one such system will be assembled. However, the final system, assembled according to the sensor set which is selected as a result of the optimization, will be mass produced and will therefore be cost-conscious.

As previously noted, quality criteria of interest include sample rate, bandwidth, bit depth, noise immunity, accuracy, and in certain contexts, signal channels. Others are also important in various contexts, and it will be understood that they may be approached in similar fashion once the principles of the invention are understood.

Embodiments of the invention are directed toward optimizing machine learning models and sensors in combination. Again, machine learning may be used as a surrogate for other methodologies of automated decision making. Nonetheless, machine learning makes the initial evaluation simple and rapid. Additionally, where machine learning is employed in the final solution, the sensors selected will be optimal. Furthermore, machine learning methods may be optimized to the sensor's quality, thus creating the best overall combination. A machine learning approach is therefore preferred in many if not all applications.

The determination of required sensor quality can include two aspects: (1) degrading the quality of the sensor to determine the corresponding degradation of accuracy of the output state (e.g. increased odds of a false positive or false negative for a given output state); and (2) improving the decision model to determine the best accuracy achievable by a sensor of given quality.

As an example of the latter issue, a machine learning method trained on 1500 Hz sample rate data might not accurately determine the accuracy of a sensor with a 250 Hz sample rate. However, if the model is retrained on 250 Hz data, it may discover different features on which to make distinctions, and if so is likely to perform much better with regard to 250 Hz. Similarly, adding noise to data will invariably degrade performance. But training on data that includes noise in the mix may create a new classifier that is more robust to noise.

Process flows for training and evaluating a machine learning model for later sensitivity testing and balancing, in accordance with two exemplary embodiments of the present invention, will now be described with reference to FIGS. 2A and 2B. As will become apparent, the described methods are suitable to implement operation 130, and particularly 133, of the method described with relation to FIG. 1.

Figure 2A:
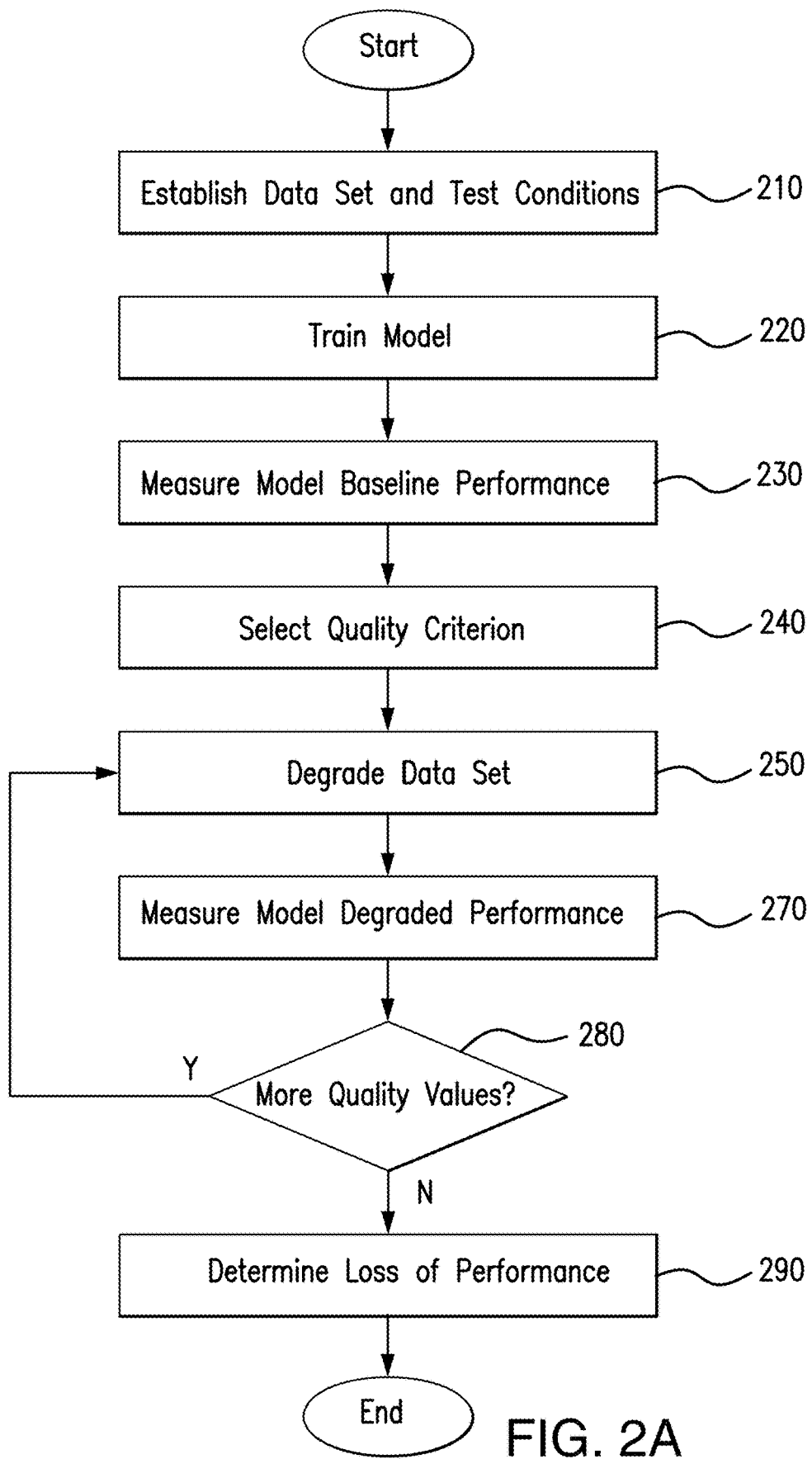
FIGS. 2A and 2B are flow diagrams illustrating flows of processes for training and evaluating a machine learning model for later sensitivity testing and balancing, in accordance with exemplary embodiments of the present invention.

In the method illustrated in FIG. 2A, at block 210, a test data set and a set of conditions to predict from that data set are established. Certain approaches for doing so have already been generally described herein, although others can be imagined by those of ordinary skill in the art. The data in the data set is preferably grouped into subsets of data points where each subset contains a data point representing an input signal received from each of a set of sensor channels, each subset thereby representing all such sensor channels receiving and transducing information in a given time frame. These subsets should include subsets representative of the conditions to be predicted; that is, particular subsets selected from the data set should, if analyzed correctly, indicate a corresponding condition, and therefore the system should produce the corresponding output state.

At this stage, the data in the data set is preferably stored at a level of detail which is representative of being received and transduced by high quality sensors: that is, sensors that rate highly on all relevant quality criteria.

At block 220, a machine learning model is trained using the test data set and training measures to predict correct output states. Suitable machine learning training measures are well-known in the art, and some non-limiting measures have already been listed elsewhere in this disclosure.

In certain embodiments, this operation includes a channel set mapping such as that of operation 131, described with relation to FIG. 1. However, in other embodiments, one or more relevant sets of sensor channels have been previously determined and fixed by a separate process, including but not limited to operations described with relation to FIG. 1. In this case, each subset of the test data set established at 210 can be limited to the input signals for those particular sensor channels. This will simplify the computations at 220 and following.

Once the model is sufficiently trained, the data set is provided to the model at block 230, and its predictions measured. The performance of these predictions (the "baseline performance") is recorded for use in later stages of the process, according to a suitable performance metric, including but not limited to accuracy, precision, and f-score. As noted previously, preferably, the predictions are based on a "hold-out" portion of the data set which was not used during the training.

At block 240, a quality criterion is selected for testing. As noted previously, quality criteria can include but are not limited to bandwidth, sample rate, bit depth, noise immunity, signal channels, and accuracy/tolerance. A series of values or levels for that quality criterion, which defines an evaluation range, is established. Preferably, the values in this series represent common values for the criteria as found in sensors available for the intended application. Such series can be preprogrammed into the training system before the process begins.

At block 250, a degraded data set is generated: the data of the original data set is degraded in quality according to one of the quality values in the series of values. The degraded data thereby simulates the result of the same information as in the original data set being received and transduced through a sensor operating at that quality value. In certain embodiments and implementations, the degradation is limited to a portion of the data set which represents a particular sensor channel, thereby simulating only that sensor being replaced with a lower quality sensor. Specific methods of degrading the data will vary depending on the quality criterion; one or more preferred methods for degrading according to each quality criterion will be described later herein.

At block 270, the degraded data set is provided to the model which was trained at 220, which predicts the output states for that data once again. Preferably, data specifically corresponding to that which was used at 230 is used again here; for example, if a hold-out portion of the data set was used for testing at 230, the degraded version of that portion is used now. (It can be seen from this that, in certain implementations, it will only be necessary to degrade particular portions of the test data set at 260, as the rest will not be used in a degraded state in this method.) The performance of these predictions (the "degraded performance") is recorded for use in later stages of the process, using the same metric as used at 230.

At block 280, if there are untested quality values in the series of values established at 240, the method returns to 250 with another of the quality values in the series. The process iterates through the entire series of quality values in this manner.

Once all quality values in the series of values are tested, at block 290, each degraded performance is compared to the baseline performance. This evaluates the loss in performance of a system using sensors operating at each level of quality, effectively mapping the performance value to the corresponding quality value. Such evaluation is optionally presented at this time to an engineer, or stored for later use. The method then ends.

In certain alternative embodiments, block 230 is omitted, and the degraded performance is mapped to the quality value and stored for consideration on its own merits, rather than in the form of a comparison to the baseline.

This method is sufficient to establish what happens when the signal quality is low in a system not specifically designed for any particular quality. However, an engineer may be able to design a system which expects lower quality signals and takes them into account, producing better performance than would be otherwise achievable for that quality level. To identify when this is the case, the preferred method illustrated in FIG. 2B is used.

Figure 2B:
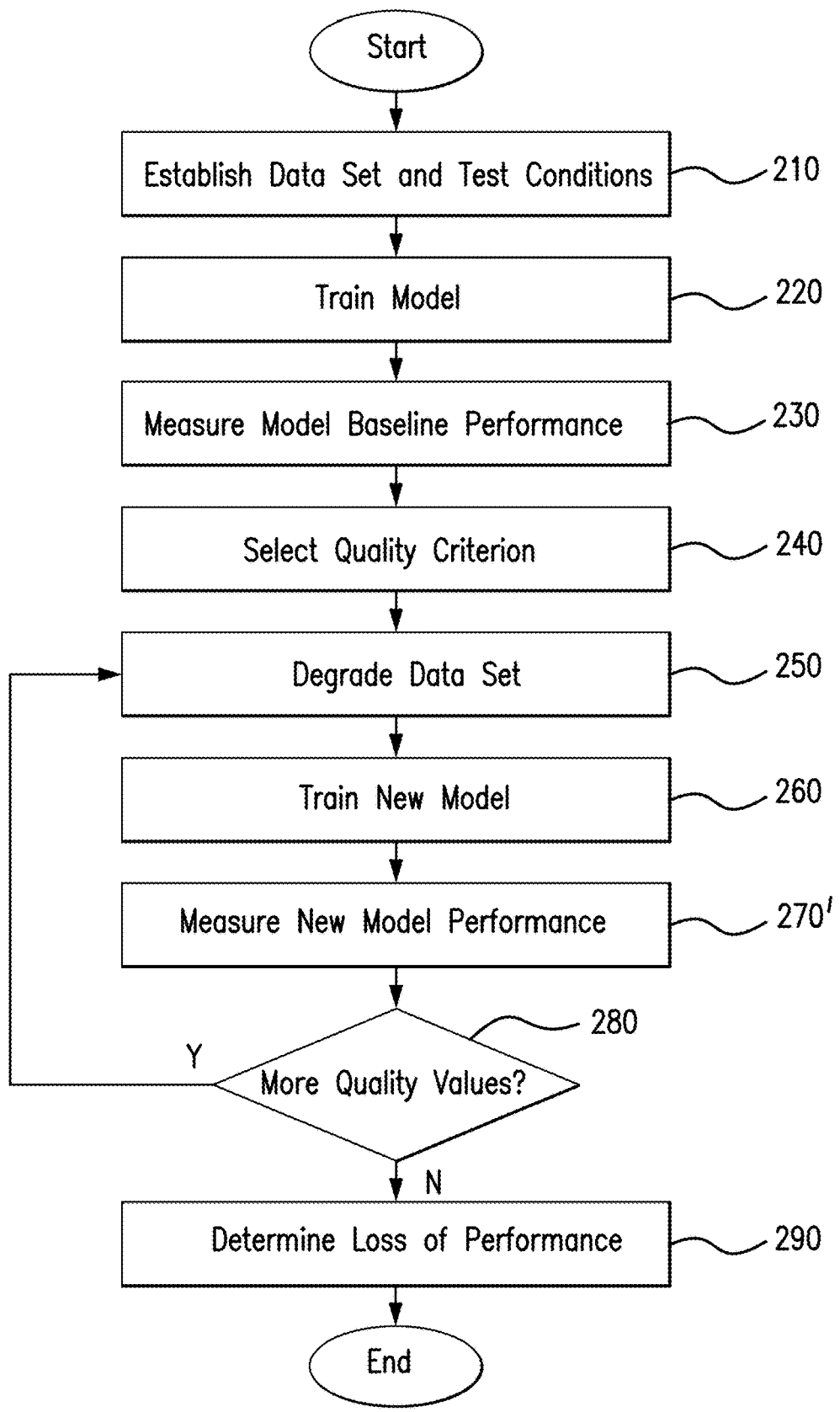

In FIG. 2B, blocks 210, 220, 230, 240, 250, 280, and 290 are the same as in FIG. 2A. The distinction occurs after 250.

At block 260, a new model is trained on the degraded data set, using the same training measures as trained the original model on the original data set at 220. Alternatively, the existing model is provided with additional training using the degraded data set. Then, at block 270', the degraded data set (or a hold-out portion or similar) is provided to the newly-trained model from block 260. The degraded performance is recorded as in the method of FIG. 2A for later comparison.

This method results in a better approximation of what is possible with a system which has been tuned to the degraded data, and therefore tuned to input signals received from sensors of the lower quality. This method also creates robust detectors that can, in some implementations, be deployed as a robust solution to process the actual data signals received when the sensor arrangement is physically implemented.

With specific regard to block 250 in both methods, as previously noted, different quality criteria will require different approaches to degrading the data appropriately.

For bandwidth, in one preferred approach, a filter is applied to the data channels. In various embodiments, the filter can be low pass, high pass, or band pass. The filter can also specifically pass some bands and suppress others, to simulate, for example, masking of frequency bands by absorption. Such filters are understood in the art of signal processing and will not be described further herein.

For sample rate, in one preferred approach, the data is filtered with a low pass filter to prevent aliasing, and then decimated by taking samples at a fixed ratio with the original data. Both operations are understood in the art of signal processing and will not be described further herein. It should be noted, that according to the Nyquist theorem, the bandwidth of the signal is inherently limited to one-half of its sample rate. Thus, bandwidth and sample rate are in some embodiments tested simultaneously, or the test of one is treated as sufficient to test the other.

For bit depth, in one preferred approach, the data is re-quantized to a particular number of bits. In certain embodiments, the bit depth may be optimized by interpolating the signal over its full dynamic range at a fixed number of quantized sample value in accordance with $2^n$, where n is the number of bits. This results in an optimal mapping, but is artificial as most sensors will not be aware of the dynamic range of the signal. In a preferred embodiment, the bit depth is mapped using its original numeric range to the binary quantization range of a standard fixed point variable type. This mimics the truncation errors and resolution loss likely to happen in a practical setting. These operations are understood in the art of signal processing and will not be described further herein.

For noise, in one preferred approach, a noise signal of the desired level is mixed with the original signal. In various embodiments, the noise is mixed at a fixed SNR to each sample time-period, or at a fixed constant level relative to the sensor channel dynamic range. Several suitable measures for generating the noise signal, as well as mixing it with other signals, exist in the art and will not be detailed herein. The noise can be random of different types (white noise, gaussian, uniform, pink noise), and can be shaped by filtering. It may also be band specific, in one or more bands, thus mimicking the masking of certain spectral ranges by noise. In certain embodiments, the noise is created by separate real-world recordings and mixed at a prescribed ratio with the clean signals. This particular approach allows an engineer to simulate very specific environmental noise, as well as specific self-noise characteristics of specific sensors.

Sensor accuracy and tolerance are generally specified by either absolute variation or percentage variation. For example, electrical sensors might be stated to be accurate within 5%, temperature probes might be accurate to within +2 degrees, and a microphone might be accurate within 3 dB at specific frequency ranges. Since a specification is based on a tolerance, and the individual variation is unknown, degradation must be simulated by introducing random errors in individual values. The variation in each value introduced by these errors can be as large as the level of tolerance being presently simulated, but no larger, and are preferably random within this range. The number of errors should be large enough to support statistical evaluation but small enough to control computations: n=5 to n=25 are example reasonable choices, though other numbers may be used without departure from the intent of the method.

Figure 3:
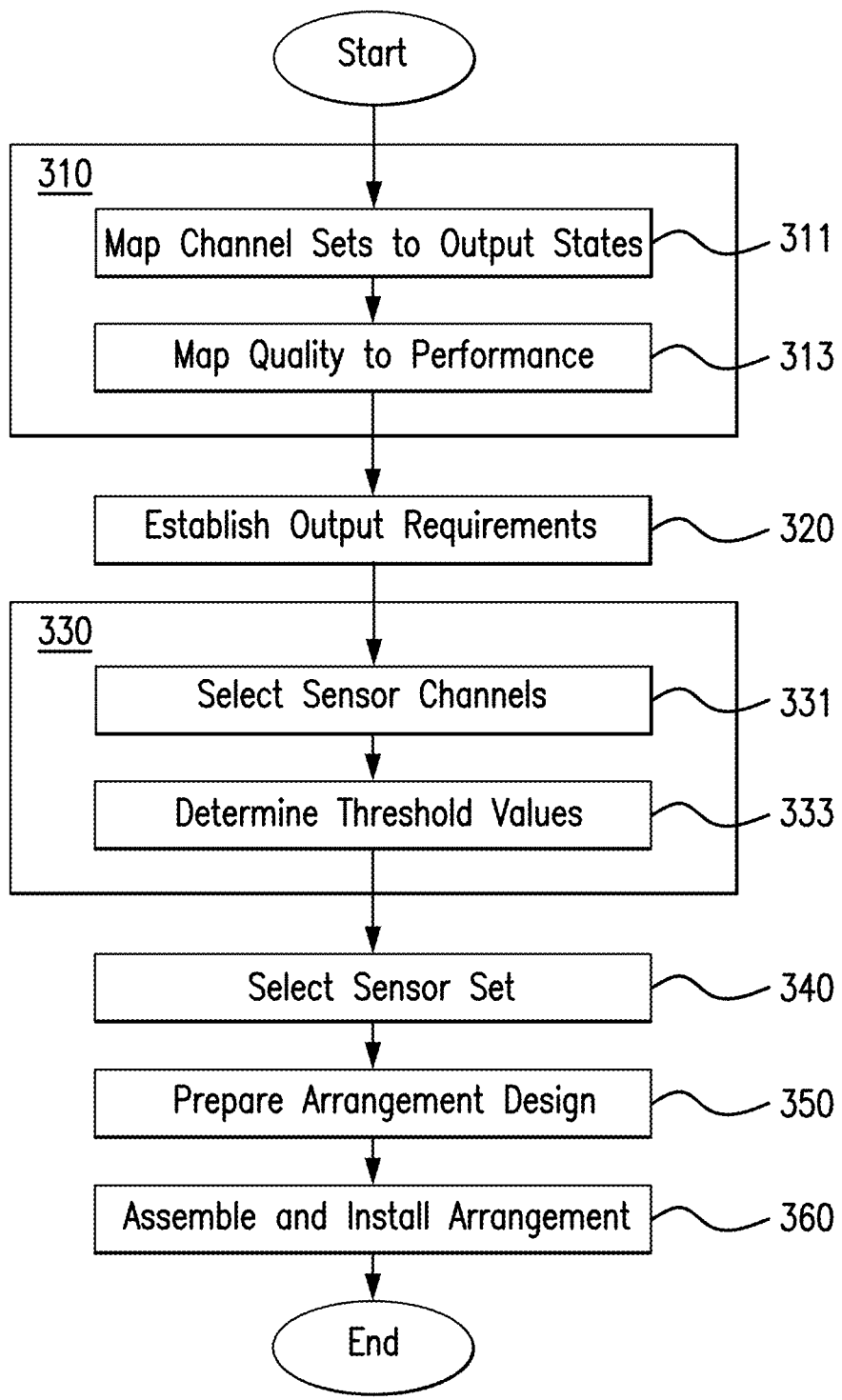
FIG. 3 is a flow diagram illustrating a flow of processes for efficiently identifying and assembling a sensor arrangement suitable for achieving a set of output requirements, in accordance with an exemplary embodiment of the present invention.

A general flow of processes for efficiently identifying and assembling a sensor arrangement suitable for achieving a set of output requirements, in accordance with an exemplary embodiment of the present invention, will now be described with reference to FIG. 3.

At block 310, a testing stage generates general mappings of sensor channels to outputs. This testing stage establishes the range of possible sensor channel combinations and quality levels with their relative outputs and performances, providing information which can be used in later stages.

Preferably, at block 311, a set of available sensor channels is mapped to a set of relevant output states, to generate a selection mapping. It can be determined from this selection mapping which sensor channel or combination of sensor channels is capable of producing a particular output state. This mapping is preferably established by aspects of the method described with respect to FIG. 1, but the operation is not limited thereto.

Preferably, as noted previously, each sensor channel defines both a sensor type (such as thermocouple, accelerometer, etc.) or type of input signal (such as temperature/heat, acceleration, etc.) and a location where the sensor will be disposed.

The output states can be measurements, determinations of a condition, or some combination thereof. It is noted that a sensor channel or set of sensors channels need not literally produce the output state itself, so long as the input signals being transduced by the channels can be analyzed by other mechanisms to produce the output states.

It is noted that the selection mapping need not be one-to-one. A single sensor channel can be mapped to a plurality of output states when that sensor channel provides sufficient information to produce each and every output state. Conversely, a single output state can be mapped to a plurality of sensor channels when no single sensor channel provides sufficient information to produce that output state, and the combination of sensor channels is required instead.

It is also noted that certain output states can be produced from other output states—for example, particular vibration measurements can lead to a determination that a component is faulty—and therefore a sensor channel mapped to the measurement will also be mapped to the determination. Knowledge of this relationship can be of importance in certain approaches to the mapping. However, in most machine learning approaches, each output state will be mapped without the learning process being "conscious" of these relationships.

The set of available sensor channels and the set of relevant output states are determined in advance of this operation, according to the needs and potential solutions of the intended implementation.

Preferably, at block 313, for each sensor channel, values or levels for a quality criterion are mapped to values or levels for a performance metric, to generate a metric mapping corresponding to the sensor channel. It can be determined, from this metric mapping, the threshold value for a quality criterion required to produce a target value for a performance metric when the sensor channel is used to produce an output state. This mapping is preferably established through use of one of the methods described with respect to FIGS. 2A and 2B, but the operation is not limited thereto.

As previously noted, quality criteria can include, but are not limited to: bandwidth, sample rate, bit depth, noise immunity, signal-to-noise ratio, number of signal channels, accuracy, and tolerance. Performance metrics represent the accuracy of an output state, which can be a scalar measurement, or a determination of a status or condition. Where the output state is a determination, performance metrics can include, but are not limited to: general accuracy percentage, rate of false positives, or rate of false negatives. Where the output state is a measurement, performance metrics can include, but are not limited to: absolute range of error, or percentage range of error.

It is noted that later executions of the method of FIG. 3, as a whole, can omit block 310 and rely on the mappings already established by an earlier execution of the method.

At block 320, a set of output requirements for a sensor arrangement are established. These output requirements preferably include a set of required output states and at least one target value for a performance metric.

In some embodiments, 320 occurs before 310 and is used to define the relevant output states for 310, which can thereby be completed quicker as only the output states needed later are considered. However, this limits the ability of the mappings generated at 310 to be reused for a different set of output requirements.

At block 330, a sensor set is generated, which defines at least one sensor channel. Each sensor channel is provided with a defined threshold value for at least one quality criterion.

Each generated sensor set is validated for the set of output requirements. This validation preferably includes at least two stages.

First, at block 331, the sensor channels of the sensor set are selected according to the set of output requirements and a predetermined set of available sensor channels. The set of available sensor channels are preferably the same set as used at 311. The selection process down-selects from the available sensor channels, such that the selected sensor channels map to the set of required output states. This mapping is preferably derived from the selection mapping generated at 311.

Then, at block 333, threshold values for the quality criterion are determined for each selected sensor channel according to the output requirements. Preferably, the determination is based on the prior testing of the sensor channel with respect to the appropriate input signal. Preferably, the determination is based on the mapping of values for the performance metric to values for the quality criterion, as established at 313.

In certain embodiments, operation 310 is not performed in advance, but occurs simultaneously with operation 330; that is, the mappings are established and then promptly used to determine the sensor set and its characteristics. More specifically, the selection mapping or other training is generated as in 311 and then used to select the sensor channels as in 331, and then the performance mapping or other training is generated as in 313 and then used to determine the threshold values as in 333.

At block 340, one of the generated sensor sets is selected. This can be a manual selection by an engineer, or automated according to selection criteria.

At block 350, an engineer prepares a full sensor arrangement design using the selected sensor set as a basis. Preferably, the full sensor arrangement includes a sensor for each sensor channel in the selected sensor set, of a type and placement as defined by the sensor channel, and having the threshold value for each quality criterion. The engineer can refine the design in aspects such as precise placement of sensors in the area identified by the sensor channel, as well as quality criteria not having threshold values defined for a sensor channel. In some circumstances, the engineer can also deviate from the threshold value of a quality criterion.

At block 360, the sensor arrangement is assembled and installed onto an intended device or framework. In many practical applications, this operation will be repeated as part of a mass production of said device or framework. The method then ends.

These and related processes, and other necessary instructions, are preferably encoded as executable instructions on one or more non-transitory computer readable media, such as hard disc drives or optical discs, and executed using one or more computer processors, in concert with an operating system or other suitable measures.

In certain implementations, the invention includes a dedicated processor or processing portions of a system on chip (SOC), portions of a field programmable gate array (FPGA), or other such suitable measures, executing processor instructions for performing the functions described herein or emulating certain structures defined herein. Suitable circuits using, for example, discrete logic gates such as in an Application Specific Integrated Circuit (ASIC), Programmable Logic Array (PLA), or Field Programmable Gate Arrays (FPGA) are in certain embodiments also developed to perform these functions.

A general system for efficiently identifying and assembling a sensor arrangement suitable for achieving a set of output requirements, in accordance with an exemplary embodiment of the present invention, will now be described with reference to FIG. 4.

Figure 4:
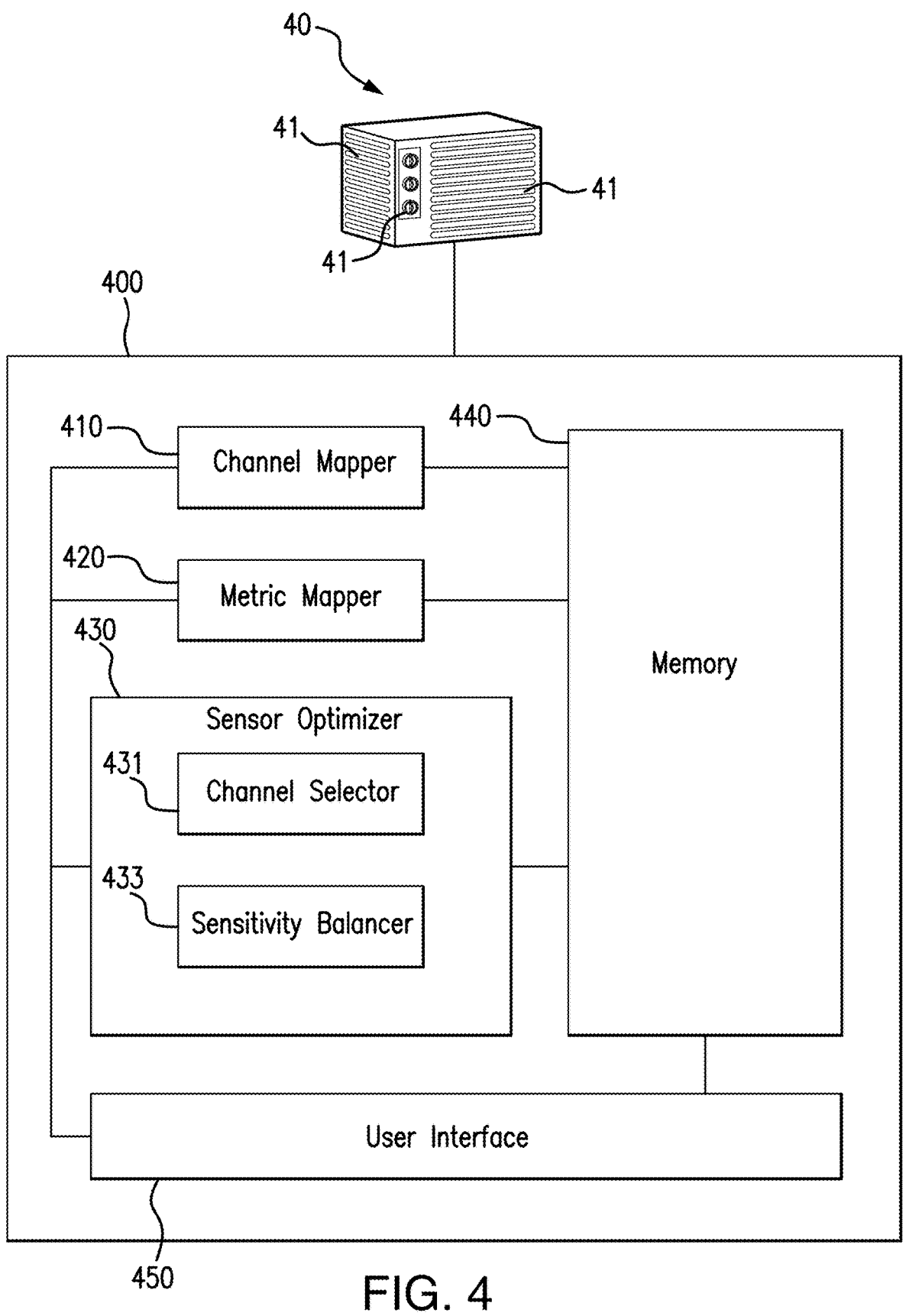
FIG. 4 is a block diagram illustrating a system for efficiently identifying and assembling a sensor arrangement suitable for achieving a set of output requirements, in accordance with an exemplary embodiment of the present invention.

The embodiment of the system 400 illustrated in FIG. 4 includes a channel mapper 410, a metric mapper 420, a sensor optimizer 430, a memory 440, and a user interface 450. In the illustrated embodiment, these components are integrated in the same system 400. However, each component can alternatively be a distinct system, with data transferred between the systems using any suitable measures.

The channel mapper 410 is configured to map a set of sensor channels to a set of output states, to establish selection mappings. The channel mapper 410 preferably operates as described with regard to FIG. 1 and block 311 of FIG. 3, but the system is not limited thereto.

The metric mapper 420 is configured to map values or levels for a quality criterion to values or levels for a performance metric, to establish metric mappings. The metric mapper 420 preferably operates as described as described with regard to FIG. 2B and block 313 of FIG. 3, but the system is not limited thereto.

The sensor optimizer 430 is configured to generate sensor sets of sensor channels, validated according to a set of output requirements. The sensor optimizer 430 includes a channel selector 431 configured to down-select sensor channels from a set of available sensor channels, which map to a set of required output states in the output requirements. The sensor optimizer 430 also includes a sensitivity balancer 433 configured to determine threshold values of quality criteria for sensor channels, preferably according to a target value for a performance metric in the output requirements which is mapped thereto. The channel selector 431 and sensitivity balancer 433 preferably operate as described with regard to blocks 331 and 333 of FIG. 3, respectively, but the system is not limited thereto.

Preferably, the channel mapper 410, metric mapper 420, and sensor optimizer 430 are all executed on one or more processors (not depicted) which are coupled to the memory 440.

In the depicted embodiment, the system 400 is coupled to a test device 40, either physically or through a wireless transmission method. In other embodiments, data is recorded from the test device 40 by a data logger or other suitable mechanism, and transferred to the system 400 later.

The test device 40 is preferably a model of a device on which a sensor arrangement will be assembled. The test device 40 is provided with a test sensor arrangement 41 to provide sensor channels for the analysis of the channel mapper 410, metric mapper 420, and sensor optimizer 430 as necessary. As noted previously, the sensor arrangement 41 is preferably of high quality sensors, distributed such as to establish every possible sensor channel that might be desired in the final sensor arrangement. However, as noted previously, it may not be possible to fit such a large number of sensors on a single device without interference between the sensors. In such cases, a number of test devices are preferably provided, each with a different subset of the sensor set 41, such that the test devices collectively carry the entire sensor set 41. The individual test devices can then be methodically coupled to the rest of the system, tested, and de-coupled, until all sensor channels in the entire sensor set 41 has been processed.

It will be appreciated that the nature of the test device 40 can be any device for which a sensor arrangement is desirable, such that the system can be used to assist in determining optimized arrangements of the sensors. It will also be appreciated that the same system can be coupled to a variety of test devices of different natures, either simultaneously or one at a time.

Data from the other components is stored on the memory 440, which is coupled to each component, either physically or through a wireless transmission method.

The user interface 450 receives input from through one or more suitable input mechanisms such as a keyboard, mouse, touchscreen, vocal command system, and/or gesture sensor. The input includes data as the output requirements, as well as commands for the other components.

The user interface 450 also presents output on a suitable display or audio system.

It is preferable to present the data, in particular the list of generated sensor sets, to an engineer in a form that is suitable for evaluation, such that the engineer can make an informed choice about which of the generated sensor sets to select for fine-tuning and assembly into a sensor arrangement. Some illustrative examples of data presentations and other features of graphic user interfaces are shown in FIGS. 5A-5K, in accordance with exemplary embodiments of the present invention.

FIG. 5A illustrates an example setup screen which enables a user to select sensor channels to test. Each channel may be switched on and off for inclusion in the test set. Of those selected sensor channels, subsets or groups may be selected—in this embodiment, singles, pairs, triplets, or all channels. The total number of combinations is displayed for reference. This screen enables operation 120 of the method described with respect to FIG. 1, although any other suitable interface is within the scope of the invention.

Certain embodiments, not depicted, allow groups of sensor channels to be pre-established, and those groups to be explored either independently or jointly. Certain embodiments, not depicted, allow individual combinations to be entered by the user.

Figure 5B:
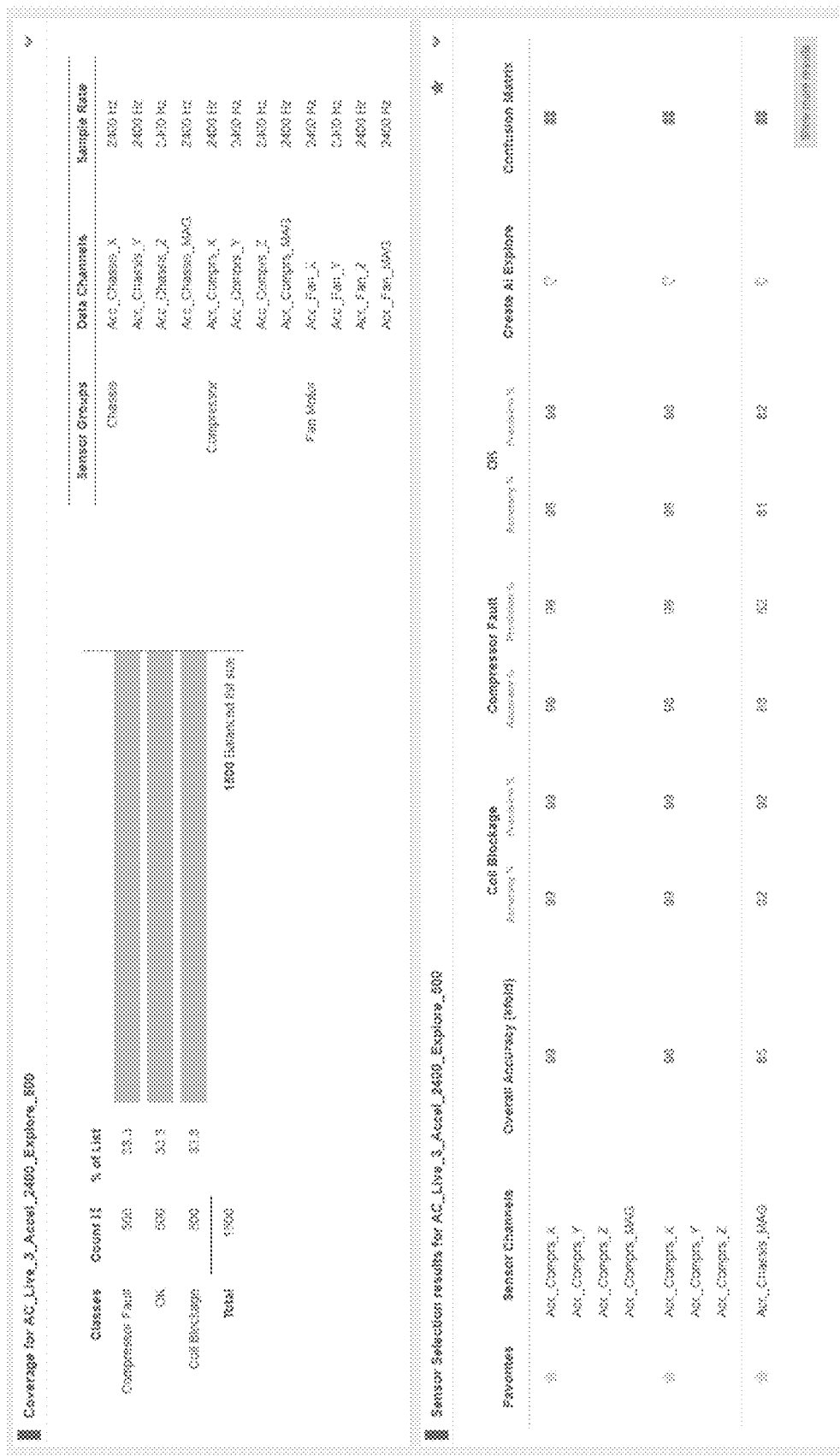

FIG. 5B illustrates an example results screen which enables a user to display and review organized results. Sensor channel groups established by the user are displayed, along with results of combinations, sorted by a user-selected column. The user can re-sort by any column. The user can also look at detailed tradeoffs by opening a confusion matrix, using the icon on the right. This screen enables operations 140 and 150 of the method described with respect to FIG. 1, although any other suitable interface is within the scope of the invention.

Figure 5C:
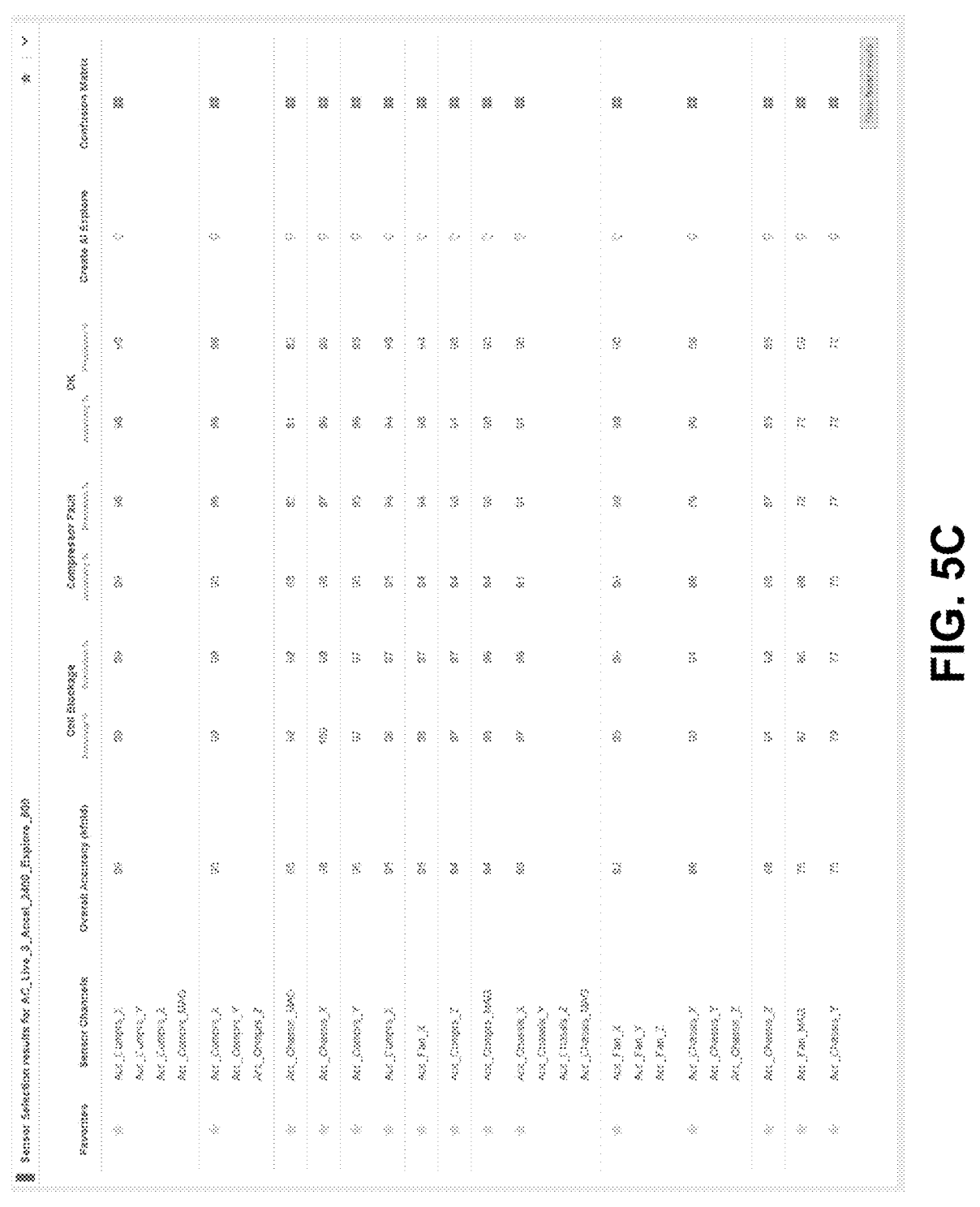

FIG. 5C illustrates an extended version of FIG. 5B. Preferably, the short version in FIG. 5B is shown by default and a user is enabled to switch to the extended version if desired.

Figure 5D:
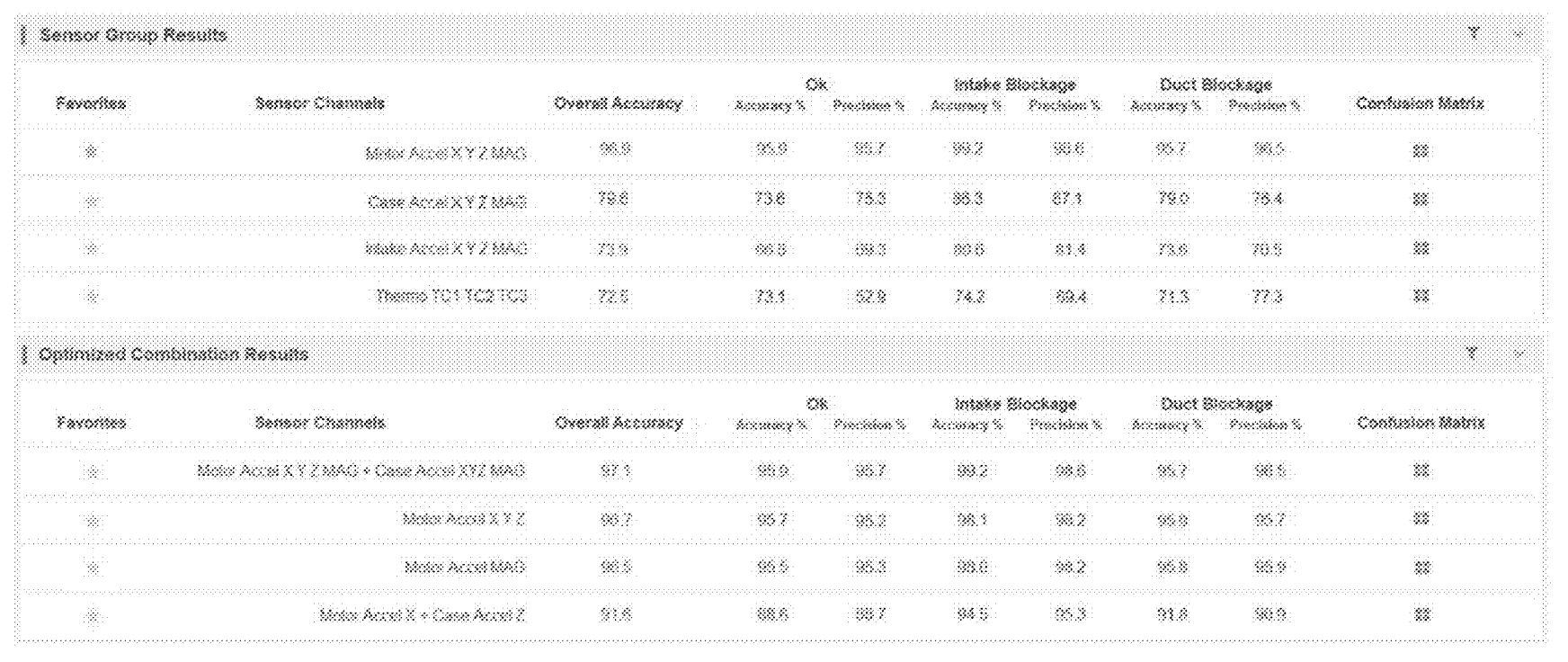

FIG. 5D illustrates an example screen displaying another, more detailed breakdown of sensor channel results, with "best combinations across groups" separated from "best sensor groups" in two charts.

Figure 5E:
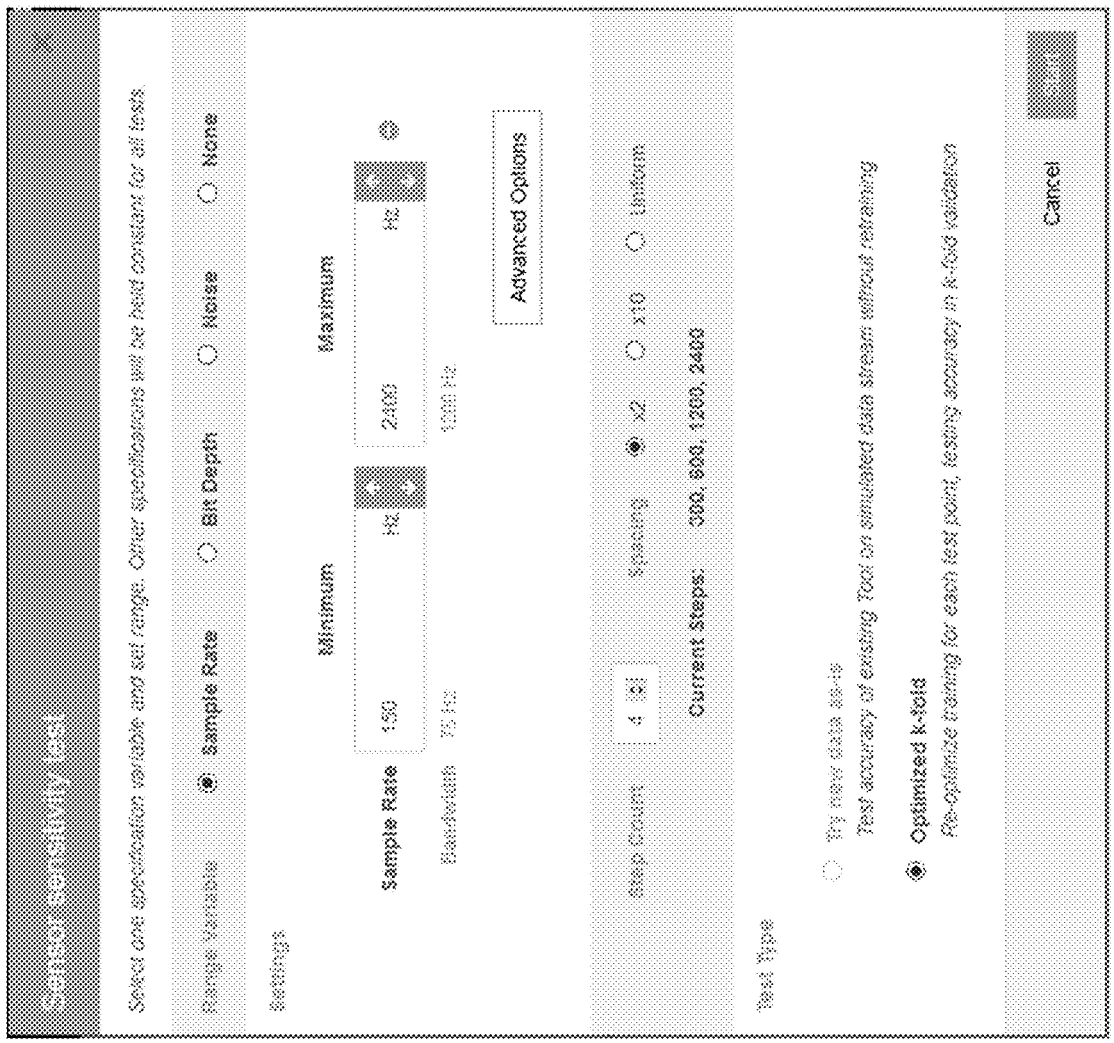

FIG. 5E illustrates a setup screen enabling users to set a range for a quality criterion—in the illustrated example, sample rates—to test. The minimum and maximum values are set, along with the number of steps or iterations. Spacing is set, and can be switched between factors of 2, factors of 10, and uniform spacing. The resulting sample rate levels to be tested are displayed as "current steps". This screen enables operation 240 of the method described with respect to FIGS. 2A and 2B, although any other suitable interface is within the scope of the invention.

The "Test Type" option is a choice to select between the method described in relation to FIG. 2A, with the machine learning model as-is, and the method described in relation to FIG. 2B, with the machine learning model being re-taught or re-optimized for each quality level. In the first case, the data is used as a test set. In the second case, the data is used for a training/test paradigm using a k-fold method such as described above.

Note that in this example embodiment, both sample rate and bandwidth are being tested, with the sample rate being set manually and the bandwidth being determined by Nyquist theorem from the sample rate.

Figure 5F:
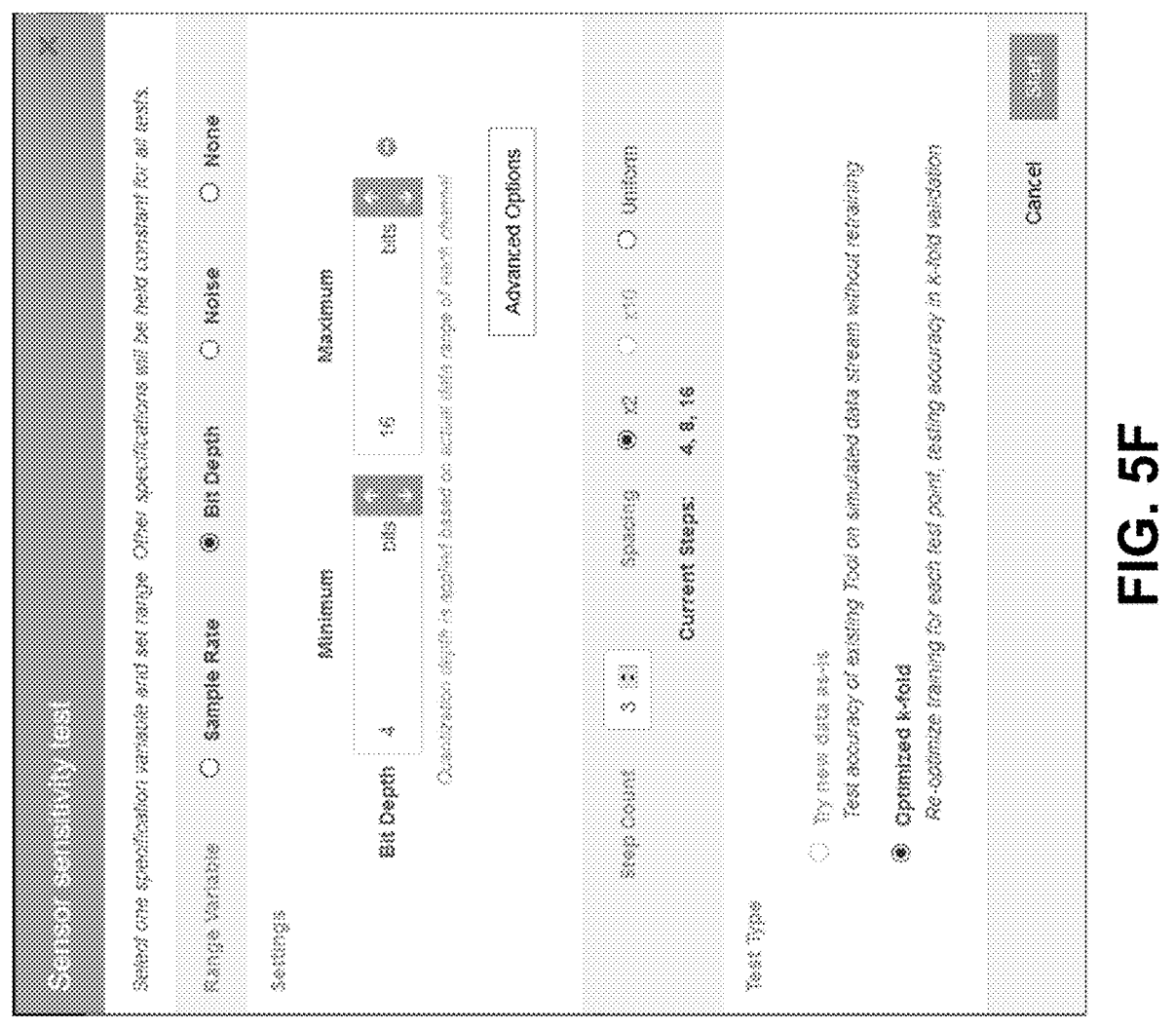

FIG. 5F illustrates the setup screen of FIG. 5E, now enabling users to set a range for bit depth. Again, the minimum and maximum are set, along with the number of steps. The spacing is also set, and can be switched between factors of 2 and uniform spacing. The resulting steps to be tested are displayed. Other features are similar to those in FIG. 5E.

Figure 5G:
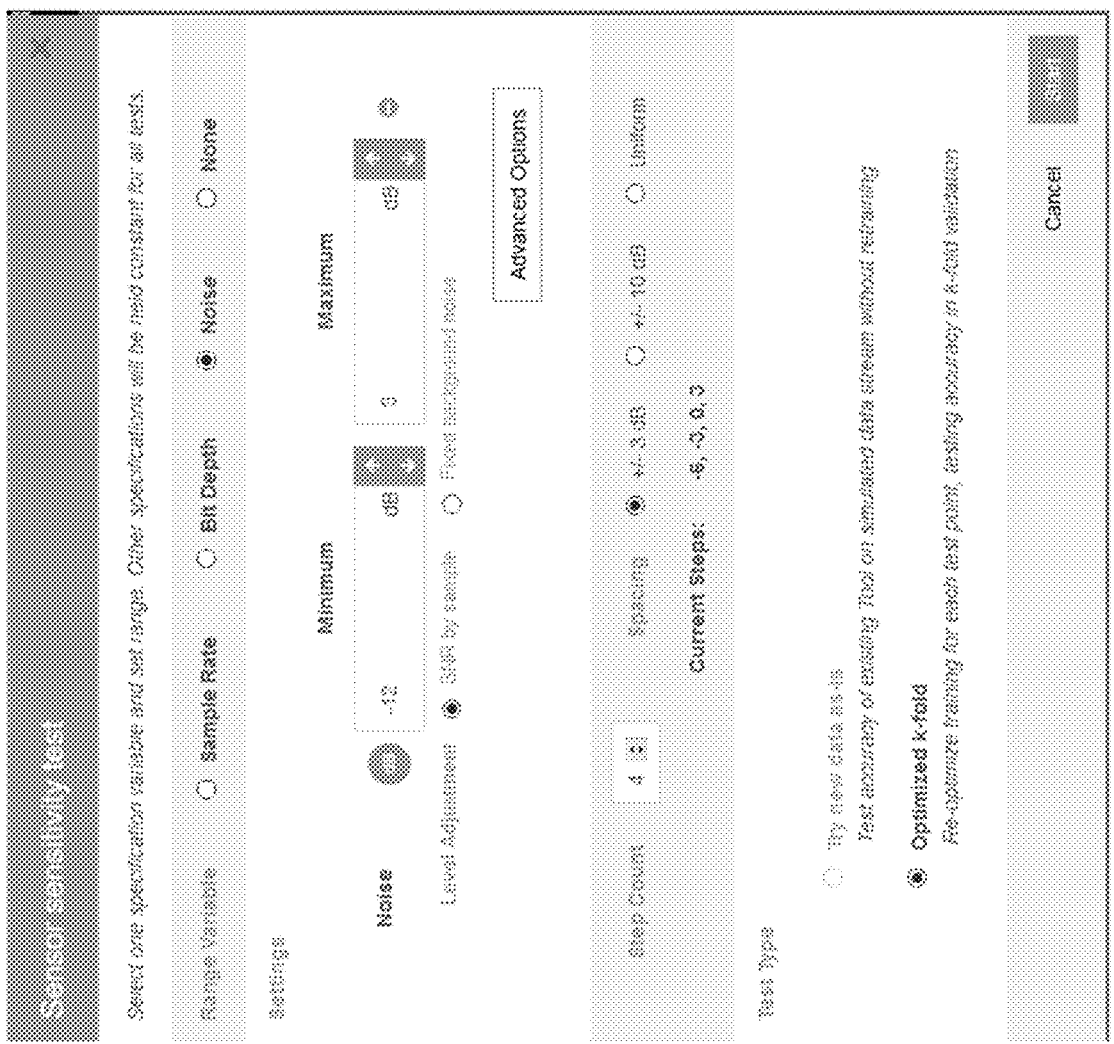

FIG. 5G illustrates the setup screen of FIG. 5E, now enabling users to set a range for noise levels. Again, the minimum and maximum are set, along with the number of steps. The spacing is also set, and can be switched between factors of 2, factors of 10, and uniform spacing. The resulting steps to be tested are displayed. Other features are similar to those in FIG. 5E.

Note that this screen permits the user to set noise level in either dB, or linear units. dB is shown. This screen also allows the user to choose between SNR levels and fixed levels for background noise, as previously described. "SNR" adjusts the noise level to each sample, while "fixed" means it is fixed for all samples.

Figure 5H:
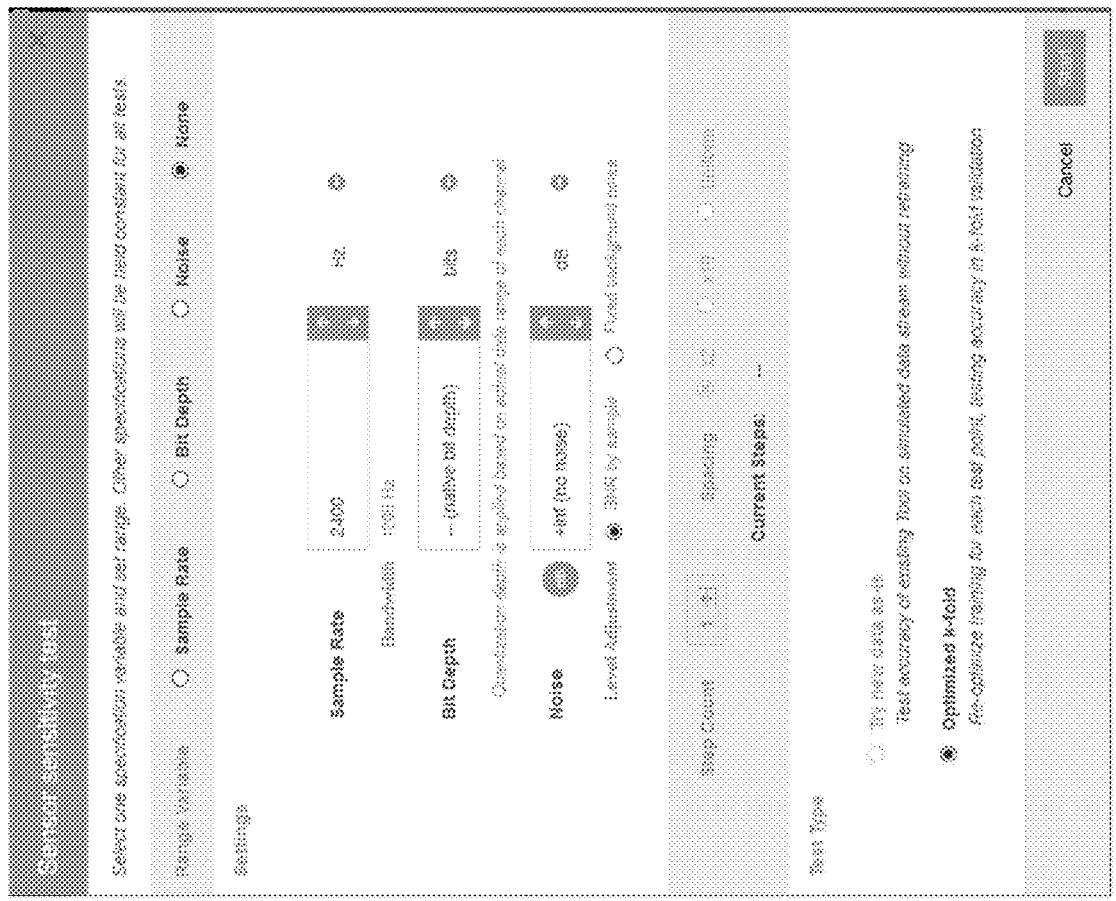

FIG. 5H illustrates the setup screen of FIG. 5E, now enabling users to set a single value for sample rate, bit depth, and noise at once, to test a specific combination. An example practical use is to simulate a specific sensor choice where all three of these criteria are factors and are known specifically. This contrasts with the previous FIGS. 5E-G, which are used to setup to examine tradeoffs over a range.

The test here is repeated for only one "step," rather than iterating through a range.

Figure 5I:
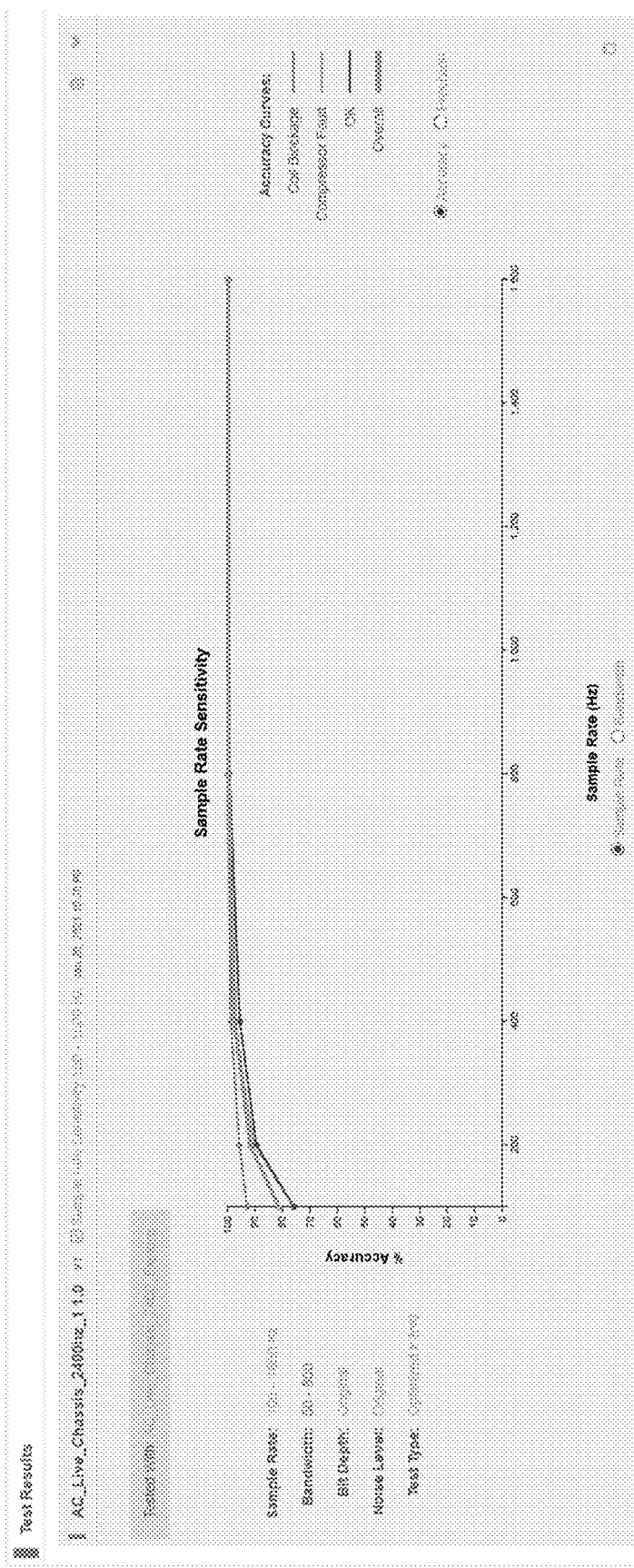

FIG. 5I illustrates a screen enabling user to display and review organized results, in this case for a sample rate range test. The curves show accuracy by sample rate for each sub class, and for an overall class. While this figure is in black and white, preferably the curves are color coded. This screen allows the user to view either accuracy or precision as the performance metric on the y axis. It also allows the user to view either bandwidth or sample rate as the quality criterion on the x axis. This screen enables the presentation aspect of operation 290 of the method described with respect to FIGS. 2A and 2B, although any other suitable interface is within the scope of the invention.

As is understood in the data science arts, "accuracy" here refers to the proportion of a ground truth class of data that is correctly classified, while "precision" refers to the proportion of an output class that correctly contains the right ground truth.

As is typical, performance rolls off with lower sample rate.

Figure 5J:
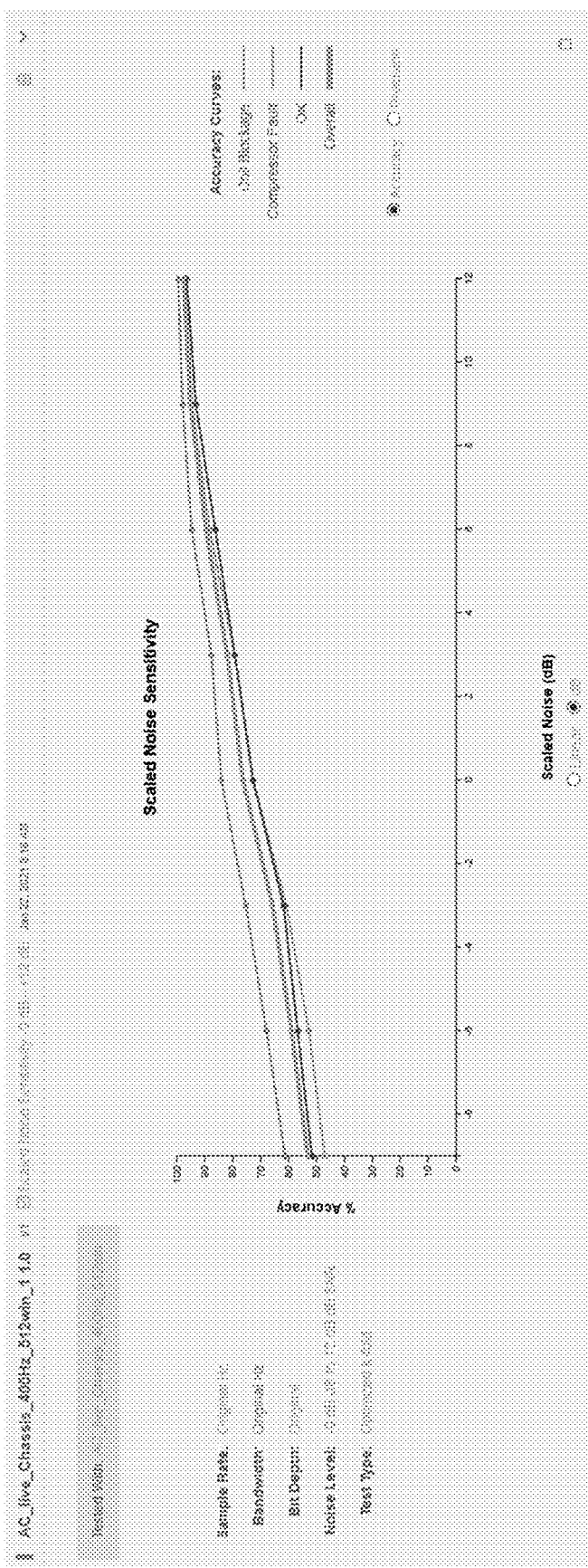

FIG. 5J illustrates a similar screen to FIG. 5I, but for noise sensitivity. Here the user may switch between dB and a linear scale for the x axis. The other features are like those in FIG. 5I.

As is typical, performance rolls off with lower SNR.

Figure 5K:
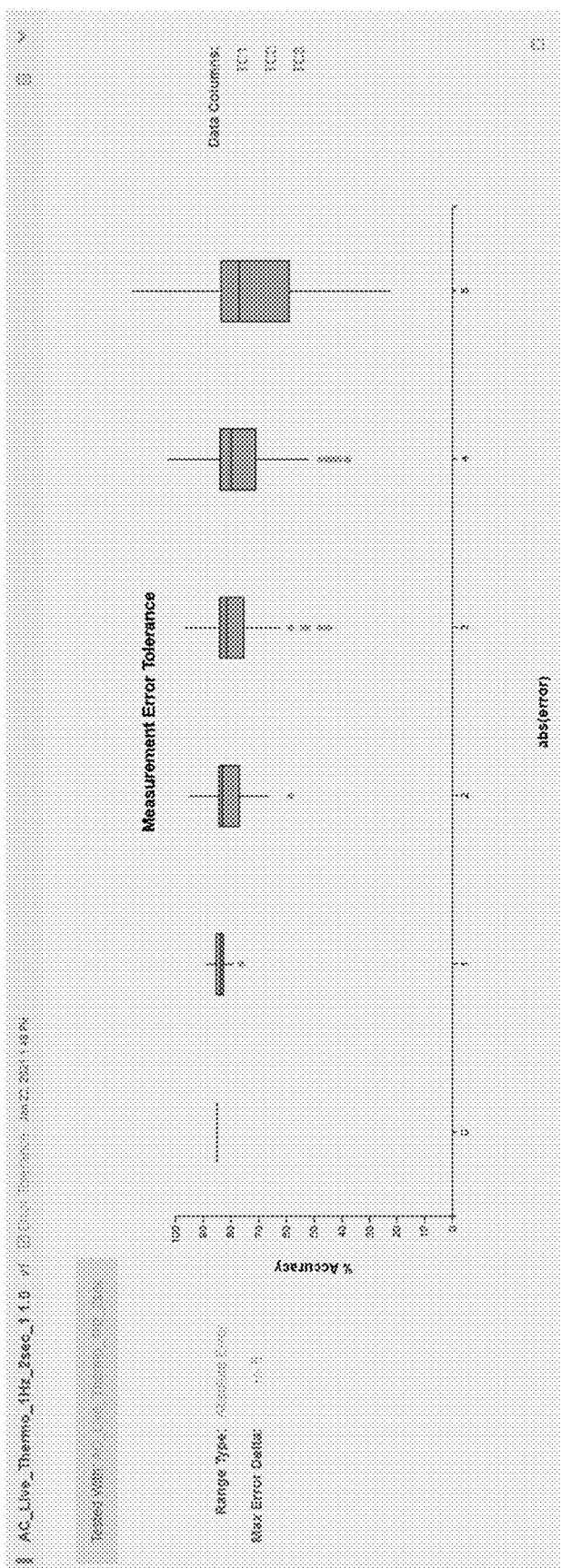

FIG. 5K illustrates a similar screen to FIG. 5I, but for tolerance. In this case, a box and whisker plot are displayed for each tolerance range test point. This plot shows the distribution of accuracies, rather than a single result for each tolerance level. This is because, as previously described, each point represents a range of random errors, and those produce a range of accuracy results.

The box plots are understood in statistics to show a median, a 25-75% quartile range, and the remaining data range. They visually represent distributions. As is typical, we see that both the median accuracy decreases, and the range of distribution increases as tolerance limits gets worse.

Taken together, the features of various embodiments of the present invention enable an engineer to save significant time in evaluating effectiveness of sensor types and combinations and selecting an optimal set of sensors for solving a problem. It also allows the engineer to carefully optimize the choice of sensors to specifications that meet performance requirements, while minimizing complexity and/or costs of the system. It is useful both when machine learning is employed in the final solution, for co-optimizing sensors and models, as well as when machine learning is not actually employed but used as a rapid evaluation surrogate for other engineered decision methods. These provide significant advances over prior art.

The descriptions above are intended to illustrate possible implementations of the disclosed system and method, and are not restrictive. While this disclosure has been made in connection with specific forms and embodiments thereof, it will be appreciated that various modifications other than those discussed above may be resorted to without departing from the spirit or scope of the disclosed system and method. Such variations, modifications, and alternatives will become apparent to the skilled artisan upon a review of the disclosure. For example, functionally equivalent elements or method operations are substitutable for those specifically shown and described, and certain features are usable independently of other features. Additionally, in various embodiments, all or some of the above embodiments are selectively combined with each other, and particular locations of elements or sequence of method operations are reversed or interposed, all without departing from the spirit or scope of the disclosed system and method as defined in the appended claims. The scope should therefore be determined with reference to the description above and the appended claims, along with their full range of equivalents.

What is claimed is:

1. A method of efficiently identifying and assembling a combination of sensors suitable for achieving a set of output requirements, the output requirements including a set of required output states, the method comprising:
    on a processor, executing a sensor optimizer to generate at least one optimized sensor set defining at least one sensor channel, each sensor channel having a threshold value for at least one quality criterion, each optimized sensor set being validated for the set of output requirements by:
        executing a channel selector to select sensor channels of the optimized sensor set according to the set of output requirements, the sensor channels of the optimized sensor set being down-selected from a predetermined set of available sensor channels, the sensor channels of the optimized sensor set mapping to the set of required output states, and
        for each selected sensor channel, executing a sensitivity balancer to determine the respective threshold value therefor according to the set of output requirements, the threshold value being determined based on a prior testing of the sensor channel with respect to an input signal therefor; and
    assembling an arrangement of sensors according to a selected one of the optimized sensor sets.

2. The method of claim 1,
    wherein the output requirements further include at least one target value for a performance metric, and
    wherein, during the prior testing, the input signal is processed at a plurality of signal quality levels for the quality criterion, the prior testing thereby training at least one machine learning model to predict output performance from a selected signal quality level.

3. The method of claim 2, wherein each of a plurality of machine learning models is trained for a corresponding subset of the predetermined set of available sensor channels at each of the plurality of signal quality levels.

4. The method of claim 2, wherein each of a plurality of machine learning models is trained at a corresponding signal quality level for each of a plurality of subsets of the predetermined set of available sensor channels.

5. The method of claim 2, wherein the threshold value of the quality criterion is determined based on a mapping of a plurality of performance values of the performance metric to a plurality of quality values of the quality criterion, each performance value mapped to its corresponding quality value by a machine learning model tested with a data set degraded in quality according to the quality value.

6. The method of claim 2, wherein the threshold value of the quality criterion is determined based on a mapping of a plurality of performance values of the performance metric to a plurality of quality values of the quality criterion, each performance value mapped to its corresponding quality value by a machine learning model trained with a data set degraded in quality according to the quality value.

7. The method of claim 6, wherein the quality criterion is sample rate, and the test data set is degraded in quality by resampling each data sample in the test data set to a selected sample rate.

8. The method of claim 6, wherein the quality criterion is bit depth, and the test data set is degraded in quality by re-quantizing each data sample in the test data set to a selected bit value.

9. The method of claim 6, wherein the quality criterion is noise immunity, and the test data set is degraded in quality by mixing a noise signal of a selected noise level and type with each data sample in the test data set.

10. The method of claim 6, wherein the quality criterion is tolerance, and the test data set is degraded in quality by introducing at least one variation no larger than a selected level of tolerance to each data sample in the test data set.

11. A method of efficiently identifying and assembling a combination of sensors suitable for achieving a set of output requirements, the method comprising:

testing each sensor channel of a predetermined set of sensor channels by transducing at least one input signal, the input signal being processed at a plurality of quality levels for at least one quality criterion;

on a processor, executing a sensor optimizer to generate at least one optimized sensor set validated for the set of output requirements, the optimized sensor set defining at least one sensor channel; and assembling an arrangement of sensors according to a selected one of the optimized sensor sets.

12. The method of claim 11, wherein the output requirements include a set of required output states, wherein the testing generates a selection mapping of the predetermined set of sensor channels to a set of relevant output states, and wherein the sensor optimizer generates the optimized sensor set at least in part by down-selecting the sensor channels defined therein from a predetermined set of available sensor channels, the sensor channels of the optimized sensor set mapping to the set of required output states.

13. The method of claim 11, wherein the output requirements include at least one target value for a performance metric, wherein the testing trains at least one machine learning model to predict output performance from a selected signal quality level, and wherein each sensor channel defined in the optimized sensor set has a threshold value for at least one quality criterion, the sensor optimizer determining the threshold value for each sensor channel according to the target value of the output requirements.

14. The method of claim 13, wherein the threshold value of the quality criterion is determined based on a mapping of a plurality of performance values of the performance metric to a plurality of quality values of the quality criterion, each performance value mapped to its corresponding quality value by a machine learning model tested with a data set degraded in quality according to the quality value.

15. The method of claim 13, wherein the threshold value of the quality criterion is determined based on a mapping of a plurality of performance values of the performance metric to a plurality of quality values of the quality criterion, each performance value mapped to its corresponding quality value by a machine learning model trained with a data set degraded in quality according to the quality value.

16. A system for efficiently identifying and assembling a sensor arrangement suitable for achieving a set of output requirements, the output requirements including a set of required output states, the system comprising a processor and a memory coupled thereto, the processor executing a sensor optimizer to generate optimized sensor sets defining at least one sensor channel, each sensor channel having a threshold value for at least one quality criterion, the sensor optimizer including:

a channel selector configured to select sensor channels of the optimized sensor set according to the set of output requirements, the sensor channels of the optimized sensor set being down-selected from a predetermined set of available sensor channels, the sensor channels of the optimized sensor set mapping to the set of required output states, and a sensitivity balancer configured to determine a threshold value for at least one quality criterion for a sensor channel according to the set of output requirements, the determination being based on a prior testing of the sensor channel with respect to an input signal therefor, wherein the system enables an arrangement of sensors to be assembled according to an optimized sensor set generated by the sensor optimizer.

17. The system of claim 16, wherein the output requirements further include at least one target value for a performance metric, and wherein, during the prior testing, the input signal is processed at a plurality of signal quality levels for the quality criterion, the prior testing thereby training at least one machine learning model to predict output performance from a selected signal quality level.

18. The system of claim 17, wherein the threshold value of the quality criterion is determined based on a mapping of a plurality of performance values of the performance metric to a plurality of quality values of the quality criterion, each performance value mapped to its corresponding quality value by a machine learning model tested with a data set degraded in quality according to the quality value.

19. The system of claim 17, wherein the threshold value of the quality criterion is determined based on a mapping of a plurality of performance values of the performance metric to a plurality of quality values of the quality criterion, each performance value mapped to its corresponding quality value by a machine learning model trained with a data set degraded in quality according to the quality value.

* * * * *